(12) United States Patent
Umehara et al.

(10) Patent No.: US 10,833,598 B2
(45) Date of Patent: Nov. 10, 2020

(54) POWER CONVERSION DEVICE, MOTOR DRIVE CONTROL DEVICE, BLOWER, COMPRESSOR, AND AIR CONDITIONER

(71) Applicant: Mitsubishi Electric Corporation, Tokyo (JP)

(72) Inventors: Shigeo Umehara, Tokyo (JP); Takuya Shimomugi, Tokyo (JP); Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/325,475

(22) PCT Filed: Oct. 13, 2016

(86) PCT No.: PCT/JP2016/080363
§ 371 (c)(1),
(2) Date: Feb. 14, 2019

(87) PCT Pub. No.: WO2018/070012
PCT Pub. Date: Apr. 19, 2018

(65) Prior Publication Data
US 2019/0229641 A1 Jul. 25, 2019

(51) Int. Cl.
*H02P 7/14* (2006.01)
*H02M 3/158* (2006.01)
(Continued)

(52) U.S. Cl.
CPC ........ *H02M 7/217* (2013.01); *F04D 25/0606* (2013.01); *H02M 1/08* (2013.01);
(Continued)

(58) Field of Classification Search
CPC .......... H02M 7/217; H02M 1/32; H02M 1/08; H02M 3/158; H02M 7/12;
(Continued)

(56) References Cited

U.S. PATENT DOCUMENTS 8,063,596 B2 * 11/2011 Imura .................. B60L 15/025
318/400.01
8,427,092 B2 * 4/2013 Rozman .................. H02K 3/28
318/504
(Continued)

FOREIGN PATENT DOCUMENTS

JP   2015-023606 A   2/2015
JP   2016-123148 A   7/2016
(Continued)

OTHER PUBLICATIONS

International Search Report of the International Searching Authority dated Nov. 22, 2016 for the corresponding International application No. PC/JP2016/080363 (and English translation).
(Continued)

*Primary Examiner* — Eduardo Colon Santana
*Assistant Examiner* — Zemenay T Truneh
(74) *Attorney, Agent, or Firm* — Posz Law Group, PLC

(57) ABSTRACT

A power conversion device includes: a rectifying unit rectifying an AC voltage output from an AC power supply; a booster circuit boosting an output voltage of the rectifying unit; a control unit causing the booster circuit to perform synchronous rectification; and a smoothing capacitor smoothing an output voltage of the booster circuit. The booster circuit is constituted by connecting a plurality of chopper circuits in parallel to each other, the chopper circuits each including an upper arm switching element and a lower arm switching element connected in series to a reactor connected to the rectifying unit, and the control unit generates a drive pulse causing the upper arm switching element to be turned on when a reverse current flows through the upper arm switching element.

20 Claims, 14 Drawing Sheets

(51) Int. Cl.
*H02M 7/217* (2006.01)
*H02P 27/06* (2006.01)
*H02M 1/32* (2007.01)
*F04D 25/06* (2006.01)
*H02M 1/08* (2006.01)
*H02M 7/12* (2006.01)
*H02M 1/00* (2006.01)
*H02K 3/18* (2006.01)
*H02M 1/42* (2007.01)

(52) U.S. Cl.
CPC ............. *H02M 1/32* (2013.01); *H02M 3/158* (2013.01); *H02M 7/12* (2013.01); *H02P 27/06* (2013.01); *H02K 3/18* (2013.01); *H02M 1/4208* (2013.01); *H02M 2001/0048* (2013.01); *H02M 2003/1586* (2013.01)

(58) Field of Classification Search
CPC .. H02M 2001/0048; H02M 2003/1586; F04D 25/0606; F04D 25/06; F04D 27/00; H02P 27/06; H02P 2201/09
USPC .............................. 318/504, 400.26, 400.01
See application file for complete search history.

(56) References Cited

U.S. PATENT DOCUMENTS

| | | | | |
|---|---|---|---|---|
| 8,598,920 | B2* | 12/2013 | Nakatake | H02M 1/08 327/109 |
| 2004/0100149 | A1* | 5/2004 | Lai | H02J 9/062 307/82 |
| 2011/0132899 | A1* | 6/2011 | Shimomugi | H02M 3/1584 219/620 |
| 2011/0149622 | A1* | 6/2011 | Lin | H02M 1/4208 363/124 |

FOREIGN PATENT DOCUMENTS

| | | |
|---|---|---|
| JP | 2016-171617 A | 9/2016 |
| KR | 20110138592 A | 12/2011 |

OTHER PUBLICATIONS

Office Action dated Oct. 23, 2019 issued in corresponding JP patent application No. 2018-544638 (and English translation).
Office Action dated Jun. 1, 2020 issued in corresponding CN patent application No. 201680089716.0 (and English translation).

* cited by examiner ial application of
International Patent Application No. PCT/JP2016/080363
filed on Oct. 13, 2016, the disclosure of which is incorporated herein by reference.

TECHNICAL FIELD

The present invention relates to a power conversion device of an interleaving type, a motor drive control device, a blower, a compressor, and an air conditioner.

BACKGROUND

A power factor improvement circuit disclosed in Patent Literature 1 includes: a pair of terminals of a first input terminal and a second input terminal to which an AC voltage is input; a pair of output terminals of a first output terminal and a second output terminal from which a DC voltage is output; a first switching element and a first diode connected in parallel between the second input terminal and the first output terminal; and a second switching element and a second diode connected in parallel between the second input terminal and the second output terminal, to achieve downsizing and high efficiency of a power supply device. In addition, the power factor improvement circuit includes a first arm circuit including: a first inductor connected between the first input terminal and a first connection point; a third switching element and a third diode connected in parallel between the first connection point and the first output terminal; and a fourth switching element and a fourth diode connected in parallel between the first connection point and the second output terminal. In addition, the power factor improvement circuit includes a second arm circuit including: a second inductor connected between the first input terminal and a second connection point; a fifth switching element and a fifth diode connected in parallel between the second connection point and the first output terminal; and a sixth switching element and a sixth diode connected in parallel between the second connection point and the second output terminal. In addition, the power factor improvement circuit includes an output capacitor connected between the first output terminal and the second output terminal.

The third switching element is turned on and off by a switching drive pulse during the on state of the first switching element; the fourth switching element is turned on and off by the switching drive pulse during the on state of the second switching element that is turned on and off complementarily to the first switching element; the fifth switching element is turned on and off by the switching drive pulse during the on state of the first switching element whose phase is shifted by 180 degrees from the on state of the first switching element; and the sixth switching element is turned on and off by the switching drive pulse during the on state of the second switching element whose phase is shifted by 180 degrees from the on state of the second switching element.

Patent Literature

Patent Literature 1: Japanese Patent Application Laid-open No. 2015-23606

However, when the power factor improvement circuit disclosed in Patent Literature 1 is caused to perform interleaving operation in the current continuous mode, a discontinuous current flows in a phase close to the zero cross of an AC power supply, and a current flowing through the inductor may become 0 [A], depending on a switching frequency and an inductance value of the inductor. That is, the power factor improvement circuit disclosed in Patent Literature 1 may enter the current discontinuous mode even when being operated in the current continuous mode.

In a case where synchronous rectification is performed to reduce a loss in the switching element in a state in which interleaving operation is performed in the current continuous mode in the power factor improvement circuit disclosed in Patent Literature 1, when the third switching element and the sixth switching element are turned on in a state in which no current flows through the first inductor, a current discharged from the output capacitor flows through a path of the third switching element, the first inductor, the second inductor, and the sixth switching element. Thus, in the power factor improvement circuit disclosed in Patent Literature 1, there have been problems not only that a conduction loss caused by the current flowing through the inductor and the switching element increases, but also that a voltage of the output capacitor cannot be controlled to a specific value, power factor improvement control cannot be performed, and the device may be stopped.

SUMMARY

The present invention has been made in view of the above, and it is an object to provide a power conversion device in which control can be performed even when synchronous rectification control and interleaving control of switching elements are combined and a loss can be reduced.

To solve the above problems and achieve the object a power conversion device of an interleaving type according to the present invention includes: a rectifying unit rectifying an AC voltage output from an AC power supply; a booster circuit boosting an output voltage of the rectifying unit; a control unit causing the booster circuit to perform synchronous rectification; and a smoothing capacitor smoothing an output voltage of the booster circuit. The booster circuit is constituted by connecting a plurality of chopper circuits in parallel to each other, the chopper circuits each including an upper arm switching element and a lower arm switching element connected in series to a reactor connected to the rectifying unit, and the control unit generates a drive pulse causing the upper arm switching element to be turned on when a reverse current flows through the upper arm switching element.

The power conversion device according to the present invention has an effect that the control can be performed even when the synchronous rectification control and the interleaving control of the switching elements are combined and the loss can be reduced.

BRIEF DESCRIPTION OF DRAWINGS

FIG. 7 is a diagram illustrating a path of a current flowing when the first MOSFET is turned off and the second MOSFET is turned on.

DETAILED DESCRIPTION

Hereinafter, detailed descriptions will be made for a power conversion device, a motor drive control device, a blower, a compressor, and an air conditioner according to embodiments of the present invention with reference to the drawings. Note that, the invention is not limited to the embodiments.

First Embodiment

Figure 1:
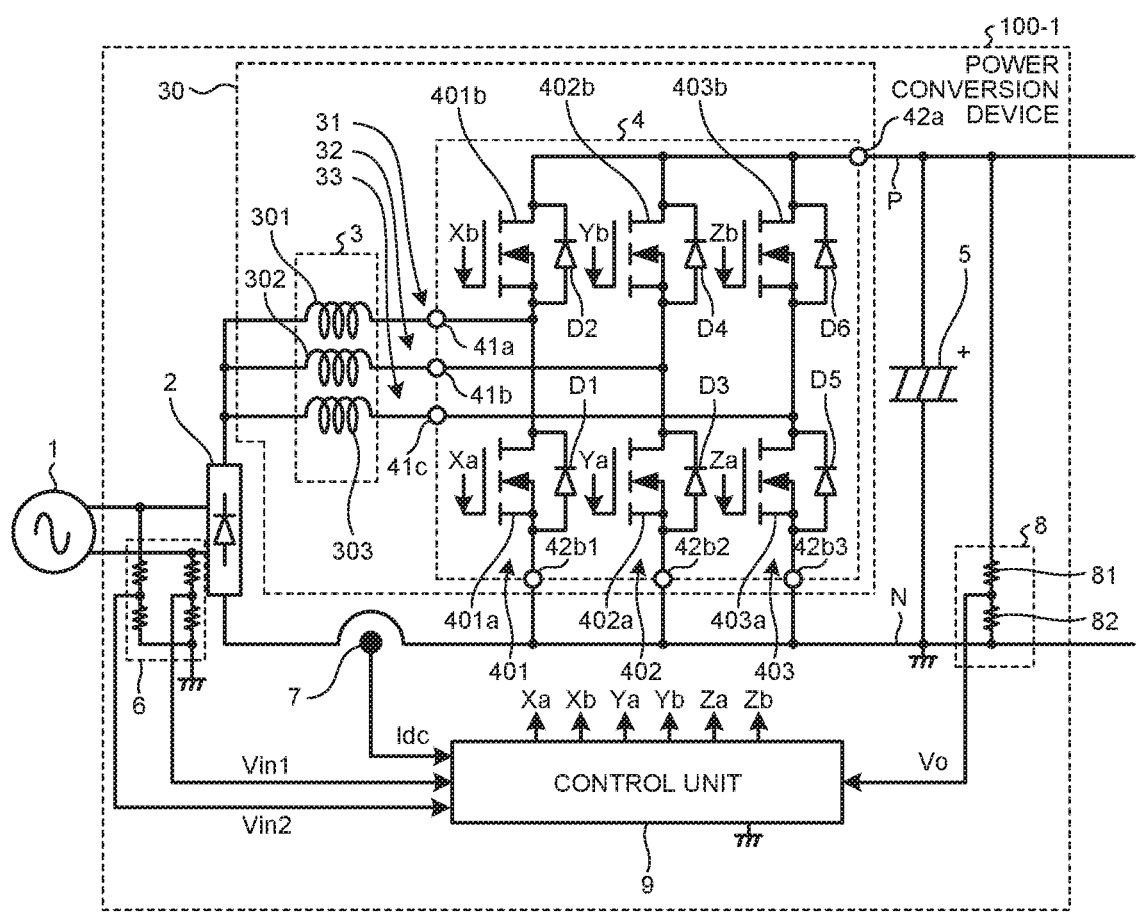
FIG. 1 is a configuration diagram of a power conversion device according to a first embodiment of the present invention.

FIG. 1 is a configuration diagram of a power conversion device according to a first embodiment of the present invention. A power conversion device 100-1 according to the first embodiment is a power conversion device of an interleaving type connected between an AC power supply 1 that is a single-phase AC power supply and a load (not illustrated). As the load, a three-phase motor can be exemplified incorporated in a blower, a compressor, or an air conditioner.

The power conversion device 100-1 includes: a rectifying unit 2 that is a single-phase rectifying unit that rectifies an AC voltage output from the AC power supply 1 that is the single-phase AC power supply; a booster circuit 30 that boosts an output voltage of the rectifying unit 2; a smoothing capacitor 5; a power supply voltage detecting unit 6; a bus current detecting unit 7; a bus voltage detecting unit 8; and a control unit 9.

As the rectifying unit 2, a full-wave rectifying circuit can be exemplified constituted by combining four diodes. The rectifying unit 2 may be constituted by combining metal oxide semiconductor field effect transistors (MOSFETs), instead of the diodes.

The smoothing capacitor 5 smoothes a voltage output from an inverter power module 4. The power supply voltage detecting unit 6 detects a power supply voltage Vin1 that is a voltage value of one phase output from the AC power supply 1 and a power supply voltage Vin2 that is a voltage value of the other phase output from the AC power supply 1, and outputs the power supply voltage Vin1 and the power supply voltage Vin2 detected to the control unit 9. The bus current detecting unit 7 detects a bus current Idc that is a value of a bus current flowing from the rectifying unit 2 to the load (not illustrated) or a bus current flowing from the load (not illustrated) to the rectifying unit 2, and outputs the bus current Idc detected to the control unit 9. The bus current Idc represents a voltage corresponding to the value of the bus current.

The bus voltage detecting unit 8 detects a bus voltage Vo that is a value of a voltage applied between both ends of the smoothing capacitor 5, and outputs the bus voltage Vo detected to the control unit 9. Specifically, the bus voltage detecting unit 8 includes a series circuit constituted by a voltage dividing resistor 81 and a voltage dividing resistor 82. One end of the series circuit is connected to a positive side DC bus P. The other end of the series circuit is connected to a negative side DC bus N. The voltage dividing resistor 81 and the voltage dividing resistor 82 divide a charging voltage of the smoothing capacitor 5 and limit a divided charging voltage to a voltage range detectable by the control unit 9.

Hereinafter, a configuration of the booster circuit 30 will be specifically described. The booster circuit 30 includes a reactor 3 whose one end is connected to a positive side output terminal of the rectifying unit 2, and the inverter power module 4. The reactor 3 includes a first reactor 301, a second reactor 302, and a third reactor 303 connected in parallel to each other.

One end of the first reactor 301 is connected to the rectifying unit 2, and the other end of the first reactor 301 is connected to a first input terminal 41a of the inverter power module 4. One end of the second reactor 302 is connected to the rectifying unit 2, and the other end of the second reactor 302 is connected to a second input terminal 41b of the inverter power module 4. One end of the third reactor 303 is connected to the rectifying unit 2, and the other end of the third reactor 303 is connected to a third input terminal 41c of the inverter power module 4.

The inverter power module 4 converts a voltage rectified by the rectifying unit 2 to a DC voltage. The DC voltage converted is output toward the load (not illustrated). The inverter power module 4 is a bridge circuit in which a first series circuit 401, a second series circuit 402, and a third series circuit 403 are connected in parallel. The first series circuit 401 includes a first MOSFET 401a and a second MOSFET 401b connected in series. The second series circuit 402 includes a third MOSFET 402a and a fourth MOSFET 402b connected in series. The third series circuit 403 includes a fifth MOSFET 403a and a sixth MOSFET 403b connected in series.

The respective drains of the second MOSFET 401b, the fourth MOSFET 402b, and the sixth MOSFET 403b are connected to a positive side output terminal 42a of the inverter power module 4. The positive side output terminal 42a is connected to the positive side DC bus P.

The source of the first MOSFET 401a is connected to a negative side output terminal 42b1 of the inverter power module 4. The source of the third MOSFET 402a is connected to a negative side output terminal 42b2 of the inverter power module 4. The source of the fifth MOSFET 403a is connected to a negative side output terminal 42b3 of the inverter power module 4. The negative side output terminal 42b1, the negative side output terminal 42b2, and the negative side output terminal 42b3 are connected to the negative side DC bus N.

The source of the second MOSFET 401b is connected to the drain of the first MOSFET 401a. The source of the fourth MOSFET 402b is connected to the drain of the third MOSFET 402a. The source of the sixth MOSFET 403b is connected to the drain of the fifth MOSFET 403a.

A connection point of the first MOSFET 401a and the second MOSFET 401b is connected to the first input terminal 41a of the inverter power module 4. A connection point of the third MOSFET 402a and the fourth MOSFET 402b is connected to the second input terminal 41b of the inverter power module 4. A connection point of the fifth MOSFET 403a and the sixth MOSFET 403b is connected to the third input terminal 41c of the inverter power module 4.

The second MOSFET 401b, the fourth MOSFET 402b, and the sixth MOSFET 403b constitute an upper arm switching element group. The second MOSFET 401b, the fourth MOSFET 402b, and the sixth MOSFET 403b are connected to the positive side DC bus P via the positive side output terminal 42a.

The first MOSFET 401a, the third MOSFET 402a, and the fifth MOSFET 403a constitute a lower arm switching element group. The first MOSFET 401a is connected to the negative side DC bus N via the negative side output terminal 42b1. The third MOSFET 402a is connected to the negative side DC bus N via the negative side output terminal 42b2. The fifth MOSFET 403a is connected to the negative side DC bus N via the negative side output terminal 42b3.

A diode D1 is connected in anti-parallel to the first MOSFET 401a. The diode D1 is a parasitic diode formed in the first MOSFET 401a. A diode D2 is connected in anti-parallel to the second MOSFET 401b. The diode D2 is a parasitic diode formed in the second MOSFET 401b. A diode D3 is connected in anti-parallel to the third MOSFET 402a. The diode D3 is a parasitic diode formed in the third MOSFET 402a. A diode D4 is connected in anti-parallel to the fourth MOSFET 402b. The diode D4 is a parasitic diode formed in the fourth MOSFET 402b. A diode D5 is connected in anti-parallel to the fifth MOSFET 403a. The diode D5 is a parasitic diode formed in the fifth MOSFET 403a. A diode D6 is connected in anti-parallel to the sixth MOSFET 403b. The diode D6 is a parasitic diode formed in the sixth MOSFET 403b.

The positive side output terminal 42a of the inverter power module 4 is connected to a positive side terminal of the smoothing capacitor 5 and one end of the bus voltage detecting unit 8. The negative side output terminal 42b1, the negative side output terminal 42b2, and the negative side output terminal 42b3 of the inverter power module 4 are connected to a negative side output terminal of the rectifying unit 2, a negative side terminal of the smoothing capacitor 5, and the other end of the bus voltage detecting unit 8.

The first reactor 301, the first MOSFET 401a, and the second MOSFET 401b constitute a first chopper circuit 31. The second reactor 302, the third MOSFET 402a, and the fourth MOSFET 402b constitute a second chopper circuit 32. The third reactor 303, the fifth MOSFET 403a, and the sixth MOSFET 403b constitute a third chopper circuit 33.

The first reactor 301 is connected to the connection point of the first MOSFET 401a and the second MOSFET 401b via the first input terminal 41a. The second reactor 302 is connected to the connection point of the third MOSFET 402a and the fourth MOSFET 402b via the second input terminal 41b. The third reactor 303 is connected to the connection point of the fifth MOSFET 403a and the sixth MOSFET 403b via the third input terminal 41c.

Hereinafter, the first MOSFET 401a, the second MOSFET 401b, the third MOSFET 402a, the fourth MOSFET 402b, the fifth MOSFET 403a, and the sixth MOSFET 403b may be simply referred to as first to sixth MOSFETs. Note that, each of the first to sixth MOSFETs may be constituted by a discrete semiconductor package, but in the power conversion device 100-1, the inverter power module 4 of 6-in-1 is used in which the first to sixth MOSFETs are mounted on one module, for controlling the three-phase motor.

The control unit 9 is implemented by a microprocessor. Based on the power supply voltage Vin1 detected by the power supply voltage detecting unit 6, the power supply voltage Vin1 detected by the power supply voltage detecting unit 6, the bus current Idc detected by the bus current detecting unit 7, and the bus voltage Vo detected by the bus voltage detecting unit 8, the control unit 9 generates a drive pulse Xa, a drive pulse Ya, and a drive pulse Za, and also generates a drive pulse Xb, a drive pulse Yb, and a drive pulse Zb.

The drive pulse Xa is a drive pulse that causes the first MOSFET 401a to be turned on and off. The drive pulse Ya is a drive pulse that causes the third MOSFET 402a to be turned on and off. The drive pulse Za is a drive pulse that causes the fifth MOSFET 403a to be turned on and off. The drive pulse Xb is a drive pulse that causes the second MOSFET 401b to be turned on and off. The drive pulse Yb is a drive pulse that causes the fourth MOSFET 402b to be turned on and off. The drive pulse Zb is a drive pulse that causes the sixth MOSFET 403b to be turned on and off. Hereinafter, the drive pulse Xa, the drive pulse Ya, and the drive pulse Za may be simply referred to as a first drive pulse, and the drive pulse Xb, the drive pulse Yb, and the drive pulse Zb may be simply referred to as a second drive pulse.

Figure 2:
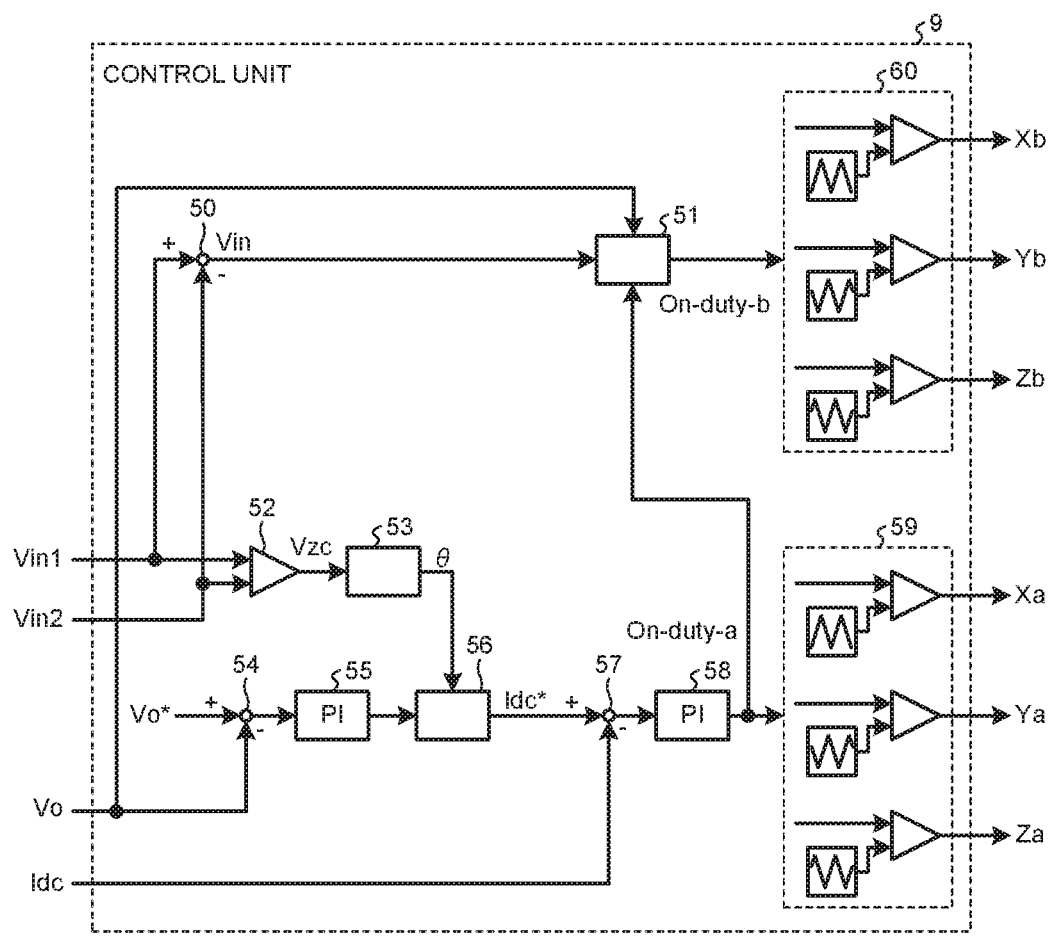
FIG. 2 is a configuration diagram of a control unit illustrated in FIG. 1.

FIG. 2 is a configuration diagram of the control unit illustrated in FIG. 1. The control unit 9 includes a subtraction unit 50, an on-duty calculating unit 51, a comparison unit 52, a power supply phase calculating unit 53, a subtraction unit 54, a proportional integral (PI) calculating unit 55, a current command value calculating unit 56, a subtraction unit 57, a PI calculating unit 58, a first drive pulse generating unit 59, and a second drive pulse generating unit 60.

The comparison unit 52 compares the power supply voltage Vin1 and the power supply voltage Vin2, detected by the power supply voltage detecting unit 6, to detect a zero cross point of the voltage of the AC power supply 1, and outputs a zero cross signal Vzc indicating the zero cross point. Based on the zero cross signal Vzc, the power supply phase calculating unit 53 calculates a power supply phase θ for each half period. The subtraction unit 54 obtains a deviation between the bus voltage Vo that is an output signal of the bus voltage detecting unit 8 and a bus voltage command value Vo* set in advance. The PI calculating unit 55 performs proportional-integral control so as to eliminate the deviation between the bus voltage Vo and the bus voltage command value Vo*, and outputs a control result to the current command value calculating unit 56.

The current command value calculating unit 56 calculates a bus current command value Idc* based on the power supply phase θ calculated by the power supply phase calculating unit 53 and the proportional-integral control result of the PI calculating unit 55. The bus current command value Idc* is a current command value of half-wave rectification with the proportional-integral control result as its amplitude and the power supply phase θ as its phase.

The subtraction unit 57 obtains a deviation between the bus current command value Idc* and the bus current Idc. The PI calculating unit 58 performs proportional-integral control of the deviation between the bus current command value Idc* and the bus current Idc to calculate On-duty-a being an on-duty of the first drive pulse. The first drive pulse generating unit 59 compares the On-duty-a being the on-duty of the first drive pulse with each of three triangular waves that are shifted by 120 degrees from each other, thereby generating the first drive pulses Xa, Ya, and Za.

The subtraction unit 50 obtains a power supply voltage Vin that is a deviation between the power supply voltage Vin1 and the power supply voltage Vin2 detected by the power supply voltage detecting unit 6. The power supply voltage Vin is an absolute value of an instantaneous voltage of the AC power supply 1. Based on the deviation obtained by the subtraction unit 50, the bus voltage Vo, and the on-duty On-duty-a of the first drive pulse, the on-duty calculating unit 51 calculates On-duty-b being an on-duty of the second drive pulse. Details will be described later of a method of calculating the On-duty-b being the on-duty of the second drive pulse. The second drive pulse generating unit 60 compares the On-duty-b being the on-duty of the second drive pulse with each of three triangular waves that are shifted by 120 degrees from each other, thereby generating the second drive pulses Xb, Yb, and Zb.

Next, the calculation will be described of the On-duty-b being the on-duty of the second drive pulse.

Figure 3:
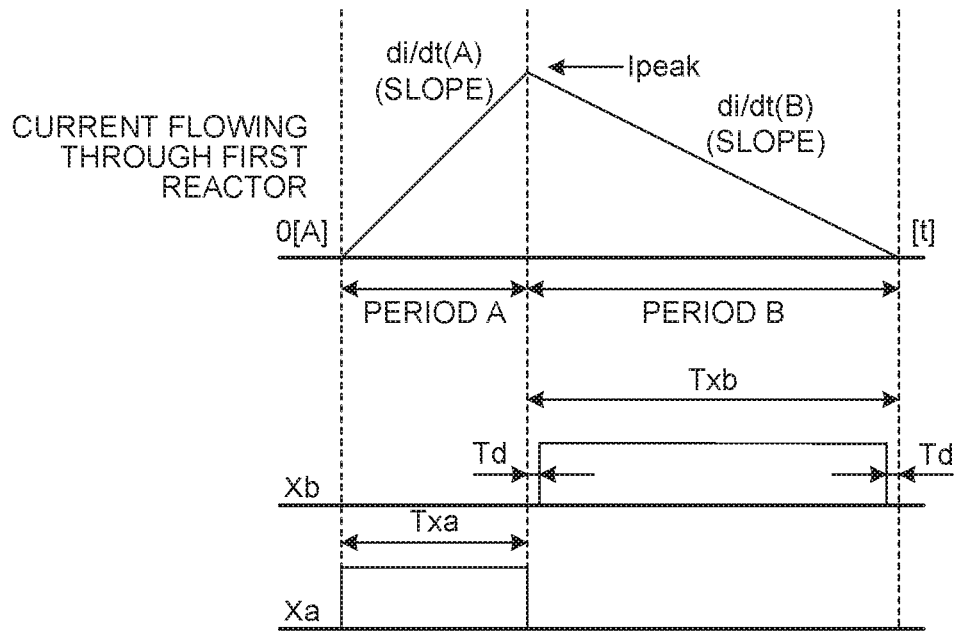
FIG. 3 is a first timing chart illustrating a relationship among a current flowing through a first reactor illustrated in FIG. 1, a first drive pulse, and a second drive pulse.
Figure 4:
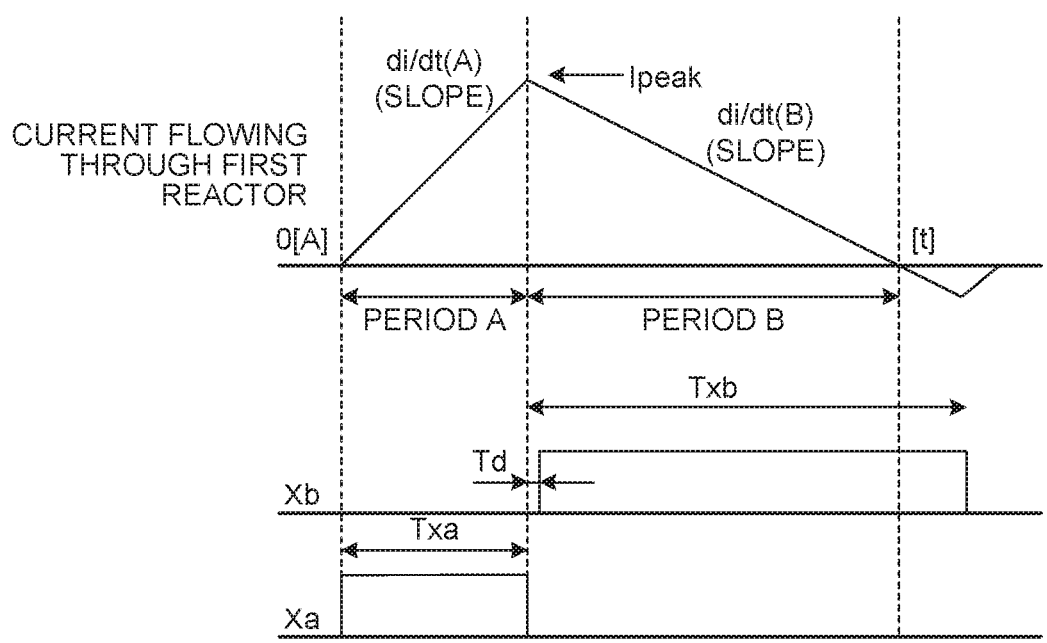
FIG. 4 is a second timing chart illustrating a relationship among the current flowing through the first reactor illustrated in FIG. 1, the first drive pulse, and the second drive pulse.
Figure 5:
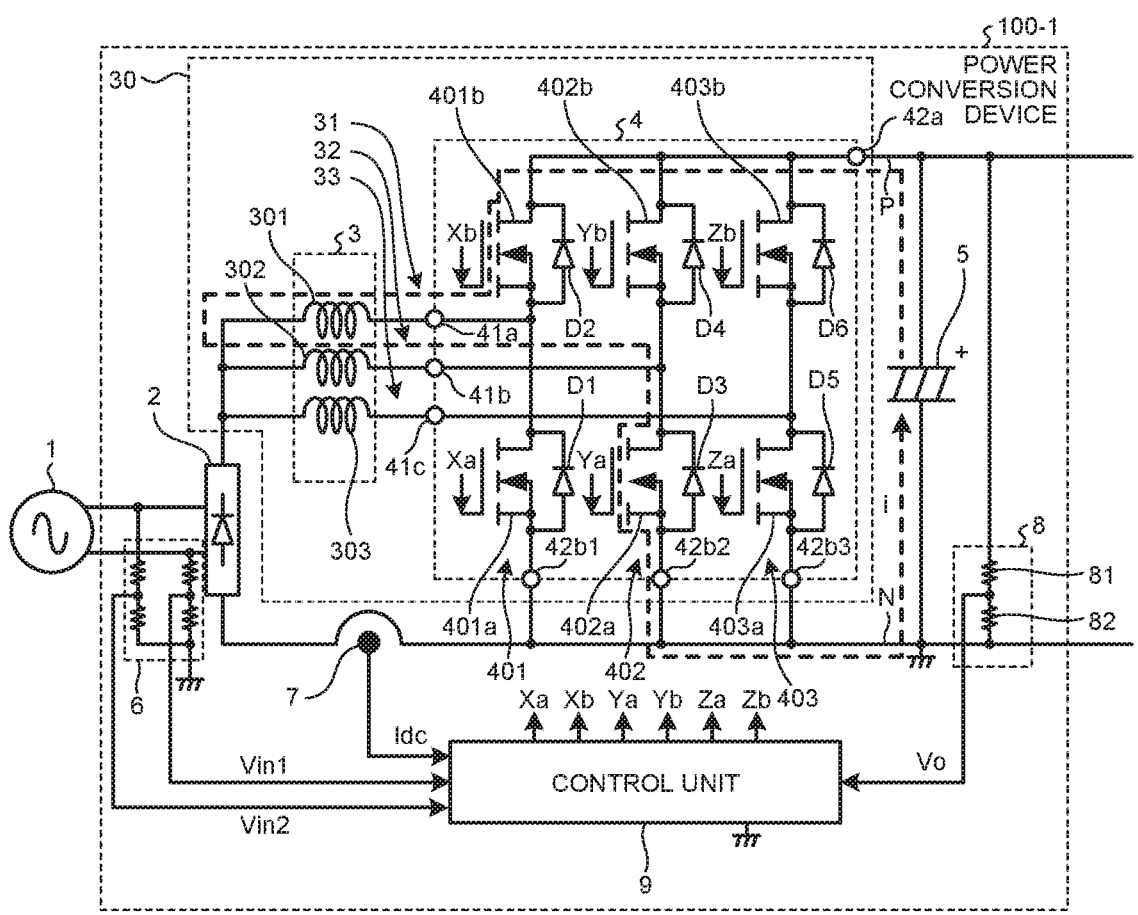
FIG. 5 is a diagram for explaining a path of a current flowing when an ON time of a second MOSFET is long.

FIG. 3 is a first timing chart illustrating a relationship among a current flowing through the first reactor illustrated in FIG. 1, the first drive pulse, and the second drive pulse. FIG. 4 is a second timing chart illustrating a relationship among the current flowing through the first reactor illustrated in FIG. 1, the first drive pulse, and the second drive pulse. FIG. 5 is a diagram for explaining a path of a current flowing when an ON time of the second MOSFET is long. Each of FIGS. 3 and 4 illustrates, from the top, a current flowing through the first reactor 301, the second drive pulse Xb, and the first drive pulse Xa.

Ipeak represents a peak value of the current flowing through the first reactor 301. A period A is equal to a time from when the current starts to flow through the first reactor 301 until the current flowing through the first reactor 301 reaches the peak value Ipeak. A period B is equal to a time from when the current flowing through the first reactor 301 reaches the peak value Ipeak until the current flowing through the first reactor 301 becomes 0 [A]. Td represents a dead time provided not to cause the first MOSFET 401a and the second MOSFET 401b to be short-circuited. Txa represents an ON time of the first drive pulse. Txb is equal to a time obtained by adding the dead time Td to an ON time of the second drive pulse.

A difference between FIG. 3 and FIG. 4 is that the ON time Txb illustrated in FIG. 4 is longer than the ON time Txb illustrated in FIG. 3 and the period B illustrated in FIG. 4 is longer than the period B illustrated in FIG. 3.

In the period A, the first MOSFET 401a is turned on during the ON time Txa by the first drive pulse Xa. As a result, a current flows through the first reactor 301 and the first MOSFET 401a with a slope of di/dt(A).

In the period B, the second MOSFET 401b is turned on during the ON time Txb by the second drive pulse Xb. As a result, a current flows through the first reactor 301 and the second MOSFET 401b with a slope of di/dt(B). At this time, even though the second MOSFET 401b is turned off, a current flows through the first reactor 301 and the second MOSFET 401b, and a reverse current flows through the second MOSFET 401b. When the reverse current flows through the second MOSFET 401b, a conduction loss in the second MOSFET 401b can be reduced by turning on the second MOSFET 401b.

Here, when the ON time Txb of the second MOSFET 401b is too long, as illustrated in FIG. 4, when the MOSFET of another phase, for example, the third MOSFET 402a is turned on in a state in which the current flowing through the first reactor 301 is 0 [A], a current in the minus direction, that is, a current in the opposite direction flows through the first reactor 301. This will be specifically described with reference to FIG. 5. When the third MOSFET 402a is turned on in a state in which the current flowing through the first reactor 301 is 0 [A], due to discharge of the smoothing capacitor 5, a current i indicated by a dotted line flows through a path of the positive side terminal of the smoothing capacitor 5, the second MOSFET 401b, the first reactor 301, the second reactor 302, the third MOSFET 402a, and the negative side terminal of the smoothing capacitor 5. At this time, problems occur that the conduction loss increases due to the current flowing through the MOSFET and the reactor, and the current output from the AC power supply 1 cannot be controlled to have a sine wave form.

Thus, it is necessary to cause the second drive pulse Xb to be changed from High to Low before the current flowing through the reactor reaches 0 [A]. That is, it is necessary to turn off the second MOSFET 401b, the fourth MOSFET 402b, and the sixth MOSFET 403b before the respective currents flowing through the first reactor 301, the second reactor 302, and the third reactor 303 reach 0 [A]. In the power conversion device 100-1, the second drive pulse Xb is therefore generated as described below.

Figure 6:
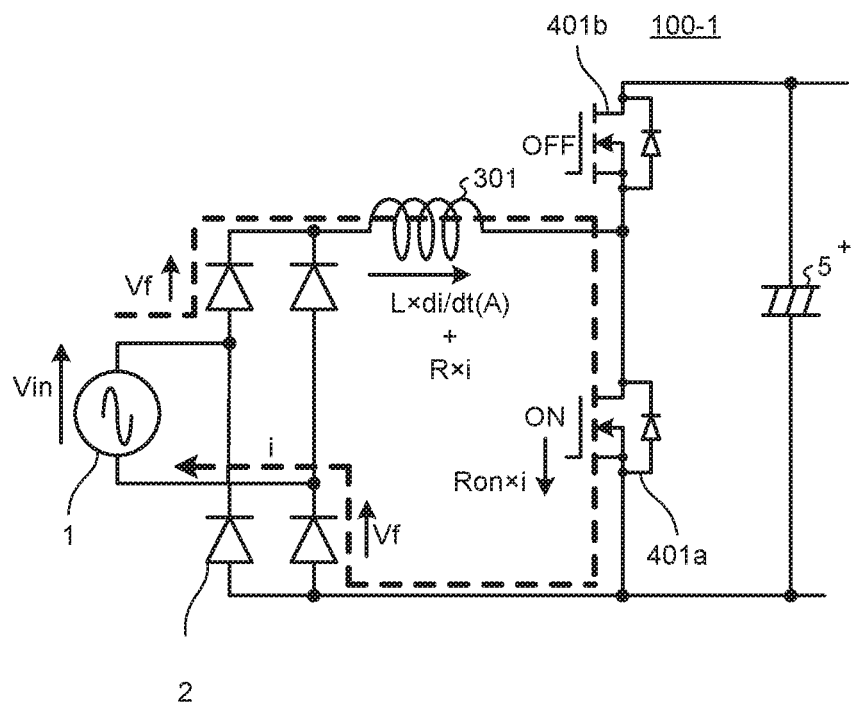
FIG. 6 is a diagram illustrating a path of a current flowing when a first MOSFET is turned on and the second MOSFET is turned off.
Figure 7:
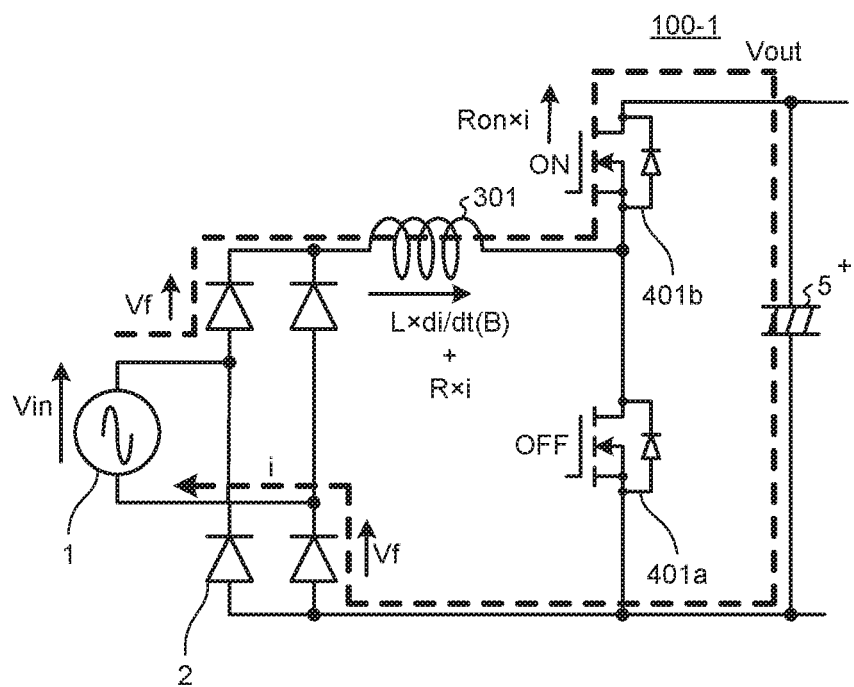

FIG. 6 is a diagram illustrating a path of a current flowing when the first MOSFET is turned on and the second MOSFET is turned off. FIG. 7 is a diagram illustrating a path of a current flowing when the first MOSFET is turned off and the second MOSFET is turned on. FIGS. 6 and 7 each illustrate an equivalent circuit of the power conversion device 100-1 focusing on the first MOSFET 401a and the second MOSFET 401b.

FIG. 6 illustrates the path of the current flowing when the first MOSFET 401a is turned on and the second MOSFET 401b is turned off, that is, during the period A illustrated in FIGS. 3 and 4. FIG. 7 illustrates the path of the current flowing when the first MOSFET 401a is turned off and the second MOSFET 401b is turned on, that is, during the period B illustrated in FIGS. 3 and 4.

Reference character "i" indicated in FIGS. 6 and 7 represents the current flowing through the path indicated by the dotted line. di/dt(A) indicated in FIG. 6 represents the slope of the current i flowing through the path indicated by the dotted line in FIG. 6. di/dt(B) indicated in FIG. 7 represents the slope of the current i flowing through the path indicated by the dotted line in FIG. 7. Vf indicated in FIGS. 6 and 7 represents a forward drop voltage of each of the diodes constituting the rectifying unit 2. Reference character "L" indicated in FIGS. 6 and 7 represents an inductance of the first reactor 301. Reference character "R" indicated in FIGS. 6 and 7 represents a resistance of the first reactor 301. Ron indicated in FIGS. 6 and 7 represents an on-resistance of each MOSFET. Vin indicated in FIGS. 6 and 7 represents the absolute value of the instantaneous voltage of the AC power supply 1. Vout indicated in FIG. 7 represents a voltage between both ends of the smoothing capacitor 5, that is, a bus voltage detected by the bus voltage detecting unit 8.

When the current i flows through the equivalent circuit illustrated in FIG. 6, the peak value Ipeak of the current illustrated in FIG. 3 is calculated by a formula (1) using the ON time Txa.

[Formula 1]

$$Ipeak = Txa \times di/dt(A) \quad (1)$$

From the equivalent circuit of FIG. 6, the power supply voltage Vin is calculated by a formula (2). In the formula (2), Vf represents the forward drop voltage of each of the diodes constituting the rectifying unit 2, L represents the inductance of the first reactor 301, R represents the resistance of the first reactor 301, i represents the current flowing through each reactor, and Ron represents the on-resistance of each MOSFET. Note that, the current i is obtained by converting the bus current Idc detected by the bus current detecting unit 7 to a value of one third of the bus current Idc.

[Formula 2]

$$Vin = 2 \times Vf + L \times di/dt(A) + R \times i + Ron \times i \quad (2)$$

By modifying the formula (2), the slope di/dt(A) of the current is calculated by a formula (3).

[Formula 3]

$$di/dt(A) = (Vin - 2 \times Vf - R - i - Ron \times i)/L \quad (3)$$

The peak value Ipeak of the current i flowing through the equivalent circuit illustrated in FIG. 6 is calculated by a formula (4) by assigning the formula (3) to the formula (1).

[Formula 4]

$$Ipeak = Txa \times \{(Vin - 2 \times Vf - R \times i - Ron \times i)/L\} \quad (4)$$

On the other hand, when the current i flows through the equivalent circuit illustrated in FIG. 7, the peak value Ipeak of the current illustrated in FIG. 3 is calculated by a formula (5) using the ON time Txb.

[Formula 5]

$$Ipeak = Txb \times di/dt(B) \quad (5)$$

From the equivalent circuit of FIG. 7, a voltage difference between the both-end voltage Vout and the power supply voltage Vin is calculated by a formula (6). In the formula (6), Vf, L, R, i and Ron are the same as Vf, L, R, i and Ron in the formula (2).

[Formula 6]

$$Vout - Vin = 2 \times Vf + L \times di/dt(B) + R \times i + Ron \times i \quad (6)$$

By modifying the formula (6), the slope di/dt(B) of the current is calculated by a formula (7).

[Formula 7]

$$di/dt(B) = (Vout - Vin - 2 \times Vf - R \times I - Ron \times i)/L \quad (7)$$

The peak value Ipeak of the current i flowing through the equivalent circuit illustrated in FIG. 7 is calculated by a formula (8) by assigning the formula (7) to the formula (5).

[Formula 8]

$$Ipeak = Txb \times (Vout - Vin - 2 \times Vf - R \times i - Ron \times i)/L \quad (8)$$

From the formulas (4) and (8), a relationship between the ON time Txa and the ON time Txb is calculated by a formula (9). However, the both-end voltage Vout and the power supply voltage Vin have a relationship of Vout>Vin−2×Vf−R×i−Ron×i.

[Formula 9]

$$Txb = Txa \times \{(Vin - 2 \times Vf - R \times i - Ron \times i)/(Vout - Vin - 2 \times Vf - R \times i - Ron \times i)\} \quad (9)$$

That is, if the ON time of the second MOSFET 401b is set to be equal to or less than (the ON time of the first MOSFET 401a)×{(Vin−2×Vf−R×i−Ron×i)/(Vout−Vin−2×Vf−R×i−Ron×i)}, the second MOSFET 401b can be caused to operate to be turned on while reverse currents flow through the second MOSFET 401b, the fourth MOSFET 402b, and the sixth MOSFET 403b.

However, when the both-end voltage Vout and the power supply voltage Vin have a relationship of Vout≤Vin−2×Vf−R×i−Ron×i, since the second drive pulse Xb cannot be estimated, the synchronous rectification by the formula (9) is not performed. That is, when the reverse currents flow through the second MOSFET 401b, the fourth MOSFET 402b, and the sixth MOSFET 403b, control is not performed in which the second MOSFET 401b, the fourth MOSFET 402b, and the sixth MOSFET 403b are turned on.

Note that, to avoid that calculation becomes complicated, the power conversion device 100-1 according to the first embodiment may calculate the ON time Txb of the second MOSFET 401b by a formula (10) in which a portion with a small influence is omitted. However, the both-end voltage Vout and the power supply voltage Vin have a relationship of Vout>Vin.

[Formula 10]

$$Txb = Txa \times \{Vin/(Vout - Vin)\} \quad (10)$$

In addition, in a region where Vout≤Vin, the power conversion device 100-1 cannot control the current output from the AC power supply 1 to have a sine wave form, and cannot control the both-end voltage between both ends of the smoothing capacitor 5 to a specific value. For that reason, in the region where Vout≤Vin, the power conversion device 100-1 does not perform synchronous rectification by the formula (10).

The power conversion device 100-1 according to the first embodiment calculates the ON time Txa of the drive pulse Xa of the first MOSFET 401a by using the formula (10), but the ON time Txa may be calculated by the formula (9) or the formula (10).

Figure 8:
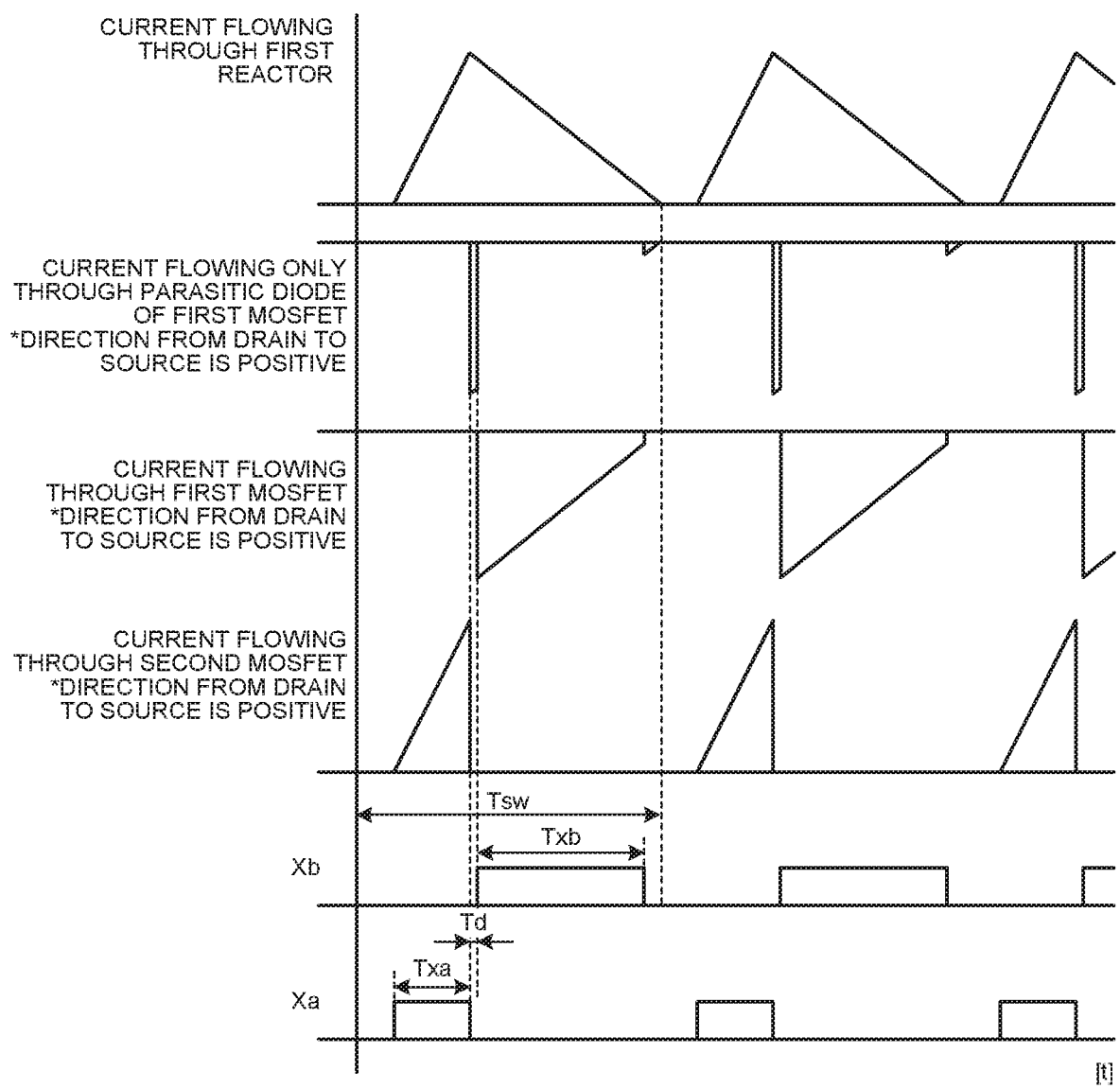
FIG. 8 is a timing chart illustrating a relationship among the current flowing through the first reactor, a current flowing through a parasitic diode of the first MOSFET, a current flowing through the first MOSFET, a current flowing through the second MOSFET, the second drive pulse, and the first drive pulse when the power conversion device according to the first embodiment of the present invention operates in a discontinuous mode.

FIG. 8 is a timing chart illustrating a relationship among the current flowing through the first reactor, a current flowing through the parasitic diode of the first MOSFET, a current flowing through the first MOSFET, a current flowing through the second MOSFET, the second drive pulse, and the first drive pulse when the power conversion device according to the first embodiment of the present invention operates in a discontinuous mode.

FIG. 8 illustrates, in order from the top, the current flowing through the first reactor 301, the current flowing through the parasitic diode of the first MOSFET 401a, the current flowing through the first MOSFET 401a, the current flowing through the second MOSFET 401b, the drive pulse Xb of the second MOSFET 401b, and the drive pulse Xa of the first MOSFET 401a. Tsw represents a switching period of the drive pulses that drive the first and second MOSFETs 401a and 401b. Txb, Txa, and Td are the ON time of the drive pulse Xb, the ON time of the drive pulse Xa, and the dead time, respectively.

When both the first MOSFET 401a and the second MOSFET 401b are turned on at the same time, an arm short circuit occurs, that is, a phenomenon occurs in which a pulse current flows from the smoothing capacitor 5. In the power conversion device 100-1, the dead time Td is provided, whereby a section is provided in which the first MOSFET 401a and the second MOSFET 401b are not turned on at the same time. For that reason, during a period of the dead time Td, a current flows only through the parasitic diode of the second MOSFET 401b.

Note that, in the discontinuous mode, a fixed time longer than the dead time is provided after the drive pulse Xa is turned off until the drive pulse Xb is turned on, and a period occurs during which the current flowing through the first reactor 301 becomes 0 [A].

Figure 9:
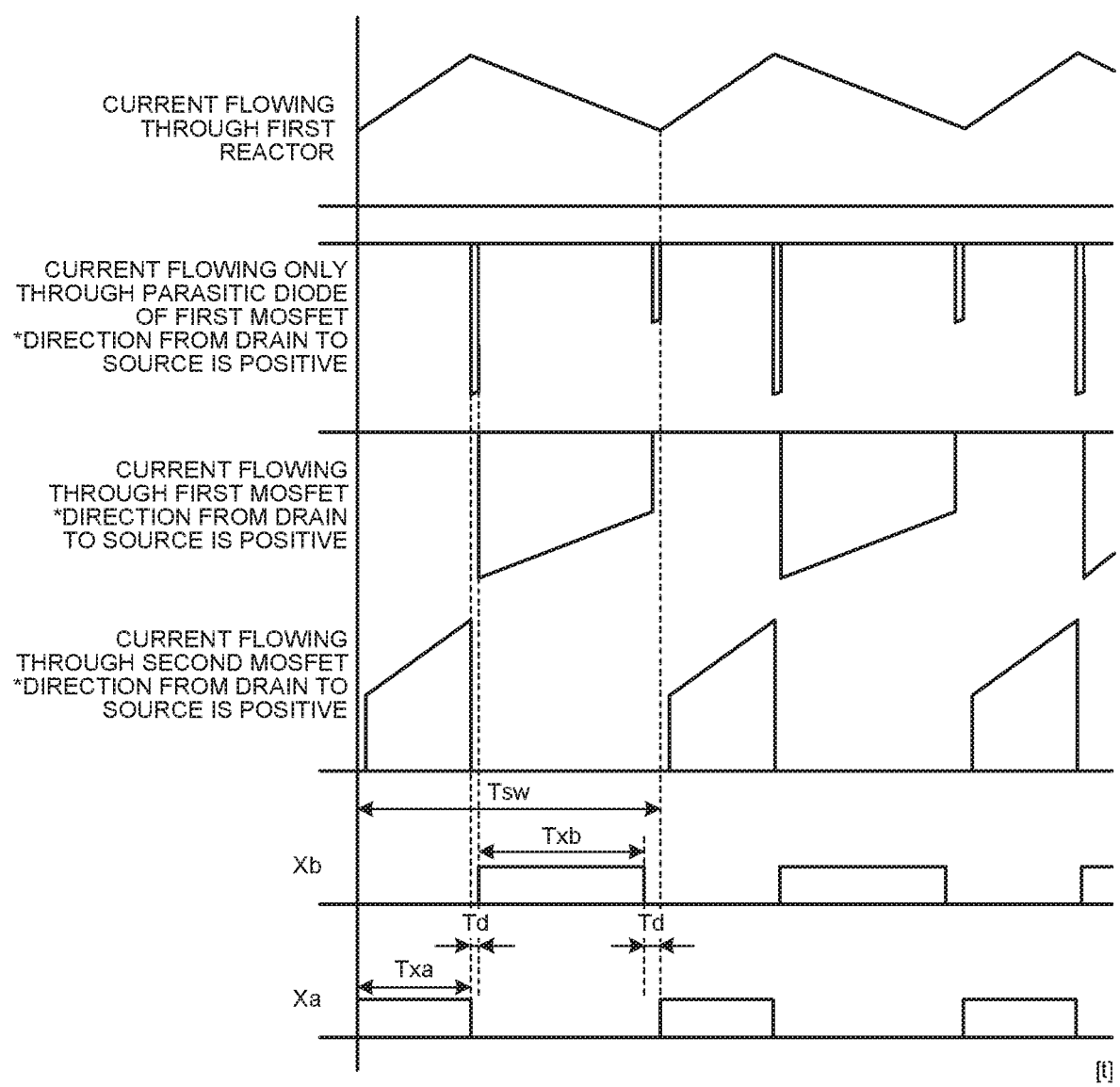
FIG. 9 is a timing chart illustrating a relationship among the current flowing through the first reactor, the current flowing through the parasitic diode of the first MOSFET, the current flowing through the first MOSFET, the current flowing through the second MOSFET, the second drive pulse, and the first drive pulse when the power conversion device according to the first embodiment of the present invention operates in a continuous mode.

FIG. 9 is a timing chart illustrating a relationship among the current flowing through the first reactor, the current flowing through the parasitic diode of the first MOSFET, the current flowing through the first MOSFET, the current flowing through the second MOSFET, the second drive pulse, and the first drive pulse when the power conversion device according to the first embodiment of the present invention operates in a continuous mode.

Similarly to FIG. 8, FIG. 9 illustrates, in order from the top, the current flowing through the first reactor 301, the current flowing through the parasitic diode of the first MOSFET 401a, the current flowing through the first MOSFET 401a, the current flowing through the second MOSFET 401b, the drive pulse Xb of the second MOSFET 401b, and the drive pulse Xa of the first MOSFET 401a.

In the continuous mode, similarly to the discontinuous mode, when both the first MOSFET 401a and the second MOSFET 401b are turned on at the same time, an arm short circuit occurs, that is, a phenomenon occurs in which a pulse current flows from the smoothing capacitor 5. In the power conversion device 100-1, the dead time Td is provided, and a section is provided in which the first MOSFET 401a and the second MOSFET 401b are not turned on at the same time. For that reason, in the period of the dead time Td, a current flows only through the parasitic diode of the first MOSFET 401a.

Note that, in the continuous mode, no time other than the dead time Td is provided from the time when the drive pulse Xa is turned off until the drive pulse Xb is turned on, and turning on and off of the drive pulse Xb and turning on and off of the drive pulse Xa are continuously performed, so that no period occurs during which the current flowing through the first reactor 301 becomes 0 [A].

However, in a region of the continuous mode, since no period occurs during which the current flowing through the first reactor 301 becomes 0 [A], the drive pulse Xb calculated by using the formula (9) or (10) continues to be turned on even after a timing at which the next first drive pulse is turned on. For this reason, the power conversion device 100-1 forcibly causes the second drive pulse to be turned off before the dead time Td set between the second drive pulse and the first drive pulse next to the second drive pulse, that is, the dead time Td set before the timing at which the next first drive pulse is turned on. In other words, the power conversion device 100-1 limits the calculation of the on-duty of the second drive pulse before the dead time Td set before the timing at which the next first drive pulse is turned on. As a result, transition from the discontinuous mode to the continuous mode or transition from the continuous mode to the discontinuous mode is performed smoothly.

More specifically, when a value obtained by Txa+Txb+Td×2 becomes equal to or greater than Tsw, the control unit 9 calculates the ON time Txb of the second drive pulse by a formula (11), where Tsw is the switching period of the drive pulses that drive the first and second MOSFETs 401a and 401b, and Td is the dead time provided not to cause the first and second MOSFETs 401a and 401b to be short-circuited.

[Formula 11]

$$Txb = Tsw - Txa - Td \times 2 \tag{11}$$

That is, the on-duty calculating unit 51 illustrated in FIG. 2, in the discontinuous mode, calculates a second drive pulse width, that is, the ON time Txb of the second MOSFET 401b by the formula (9) or (10), and in the continuous mode, calculates the ON time Txb of the second MOSFET 401b by the formula (11).

Note that, a method of calculating the first drive pulses Xa, Ya, and Za is not limited to the above example, as long as ripples are shifted by 120 degrees of the currents flowing through the respective chopper circuits including the first reactor 301, the second reactor 302, and the third reactor 303, the bus voltage is controlled to a voltage set in advance, and the current output from the AC power supply 1 is controlled to have a sine wave form. This will be specifically described with reference to FIG. 10.

Figure 10:
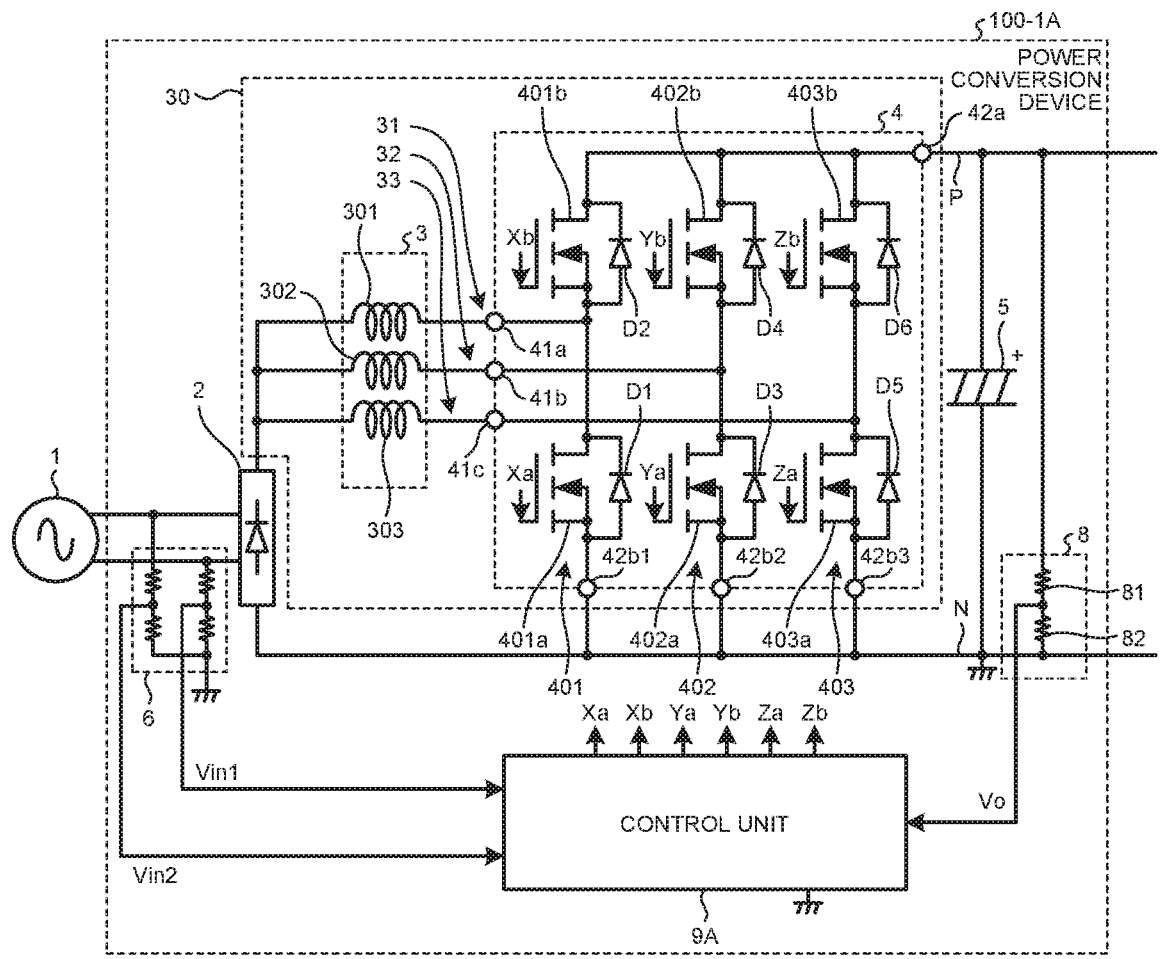
FIG. 10 is a diagram illustrating a modification of the power conversion device illustrated in FIG. 1.

FIG. 10 is a diagram illustrating a modification of the power conversion device illustrated in FIG. 1. Differences between the power conversion device 100-1 illustrated in FIG. 1 and a power conversion device 100-1A illustrated in FIG. 10 are as follows.

(1) The power conversion device 100-1A does not include the bus current detecting unit 7, and includes a control unit 9A instead of the control unit 9.

(2) The bus current Idc is not input to the control unit 9A, and the control unit 9A generates the first and second drive pulses, based on the power supply voltage Vin1 detected by the power supply voltage detecting unit 6, the power supply voltage Vin2 detected by the power supply voltage detecting unit 6, and the bus voltage Vo detected by the bus voltage detecting unit 8.

Figure 11:
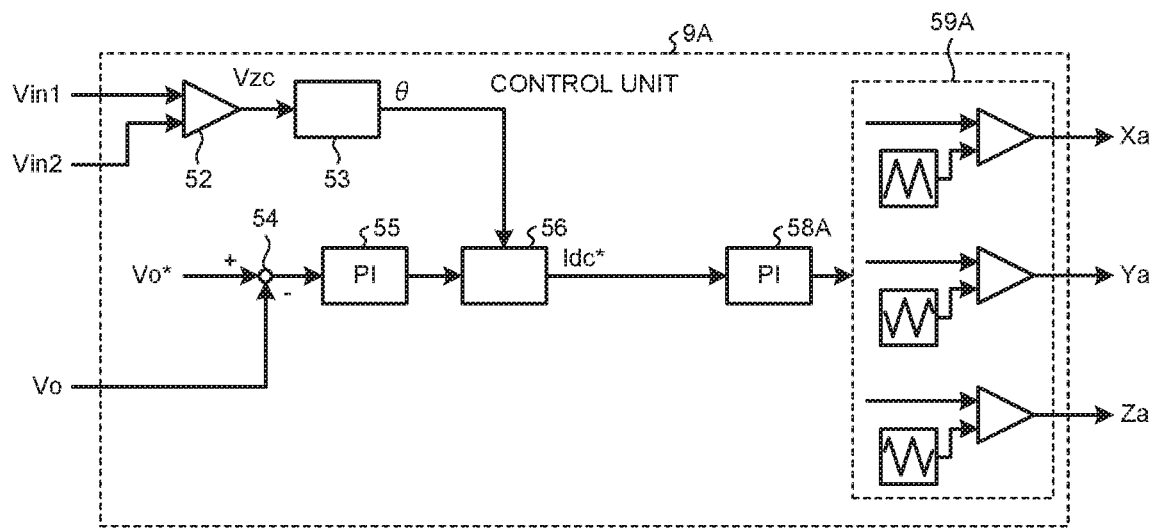
FIG. 11 is a configuration diagram of a control unit illustrated in FIG. 10.

FIG. 11 is a configuration diagram of the control unit illustrated in FIG. 10. A difference between the control unit 9 illustrated in FIG. 2 and the control unit 9A illustrated in FIG. 11 is that the control unit 9A does not include the subtraction unit 57, and includes a PI calculating unit 58A and a first drive pulse generating unit 59A instead of the PI calculating unit 58 and the first drive pulse generating unit 59. Note that, in FIG. 11, illustration is omitted of the subtraction unit 50, the on-duty calculating unit 51, and the second drive pulse generating unit 60 illustrated in FIG. 2, but the control unit 9A includes the subtraction unit 50, the on-duty calculating unit 51, and the second drive pulse generating unit 60.

The PI calculating unit 58A performs proportional-integral control of the bus current command value Idc*, and calculates the on-duty of the first drive pulse. The first drive pulse generating unit 59A compares the on-duty of the first drive pulse with each of three triangular waves that are shifted by 120 degrees from each other, thereby generating the first drive pulses Xa, Ya, and Za.

Note that, although the booster circuit 30 of the power conversion devices 100-1 and 100-1A according to the first embodiment is constituted by the three chopper circuits, the number of parallel connections of the chopper circuits is not limited to three, and may be two, or may be four or more.

In the power conversion devices 100-1 and 100-1A according to the first embodiment, based on the power supply voltage Vin1 and the power supply voltage Vin2 detected by the power supply voltage detecting unit 6, the control units 9 and 9A control the instantaneous voltage of the AC power supply 1, and also generate the zero cross signal indicating the zero cross point of the voltage of the AC power supply 1; however, instead of the control units 9 and 9A, the power supply voltage detecting unit 6 may calculate the instantaneous voltage of the AC power supply 1 and also generate the zero cross signal, and output the signal to the control units 9 and 9A. In this case, in the power conversion devices 100-1 and 100-1A, a voltage zero cross detector that is a phase detecting unit is used instead of the power supply voltage detecting unit 6. The voltage zero cross detector detects the zero cross point of the voltage of the AC power supply 1, and outputs the zero cross signal indicating the zero cross point detected to the control units 9 and 9A.

In the power conversion devices 100-1 and 100-1A according to the first embodiment, the AC power supply 1 is used that is a single-phase AC power supply, and the rectifying unit 2 is used that is a single-phase rectifying unit; however, the AC power supply 1 may be a three-phase AC power supply, and the rectifying unit 2 may be a three-phase rectifying unit.

As described above, in the power conversion devices 100-1 and 100-1A according to the first embodiment, the booster circuit 30 in which a plurality of sets of MOSFETs connected in series are connected in parallel, is caused to perform synchronous rectification operation and interleaving operation in the discontinuous mode, and the reverse current can be prevented from flowing through the reactor when the lower arm switching element of the other phase is turned on, so that control can be performed even when synchronous rectification control and interleaving control are combined, a loss can be reduced, and high efficiency can be achieved.

Second Embodiment

Figure 12:
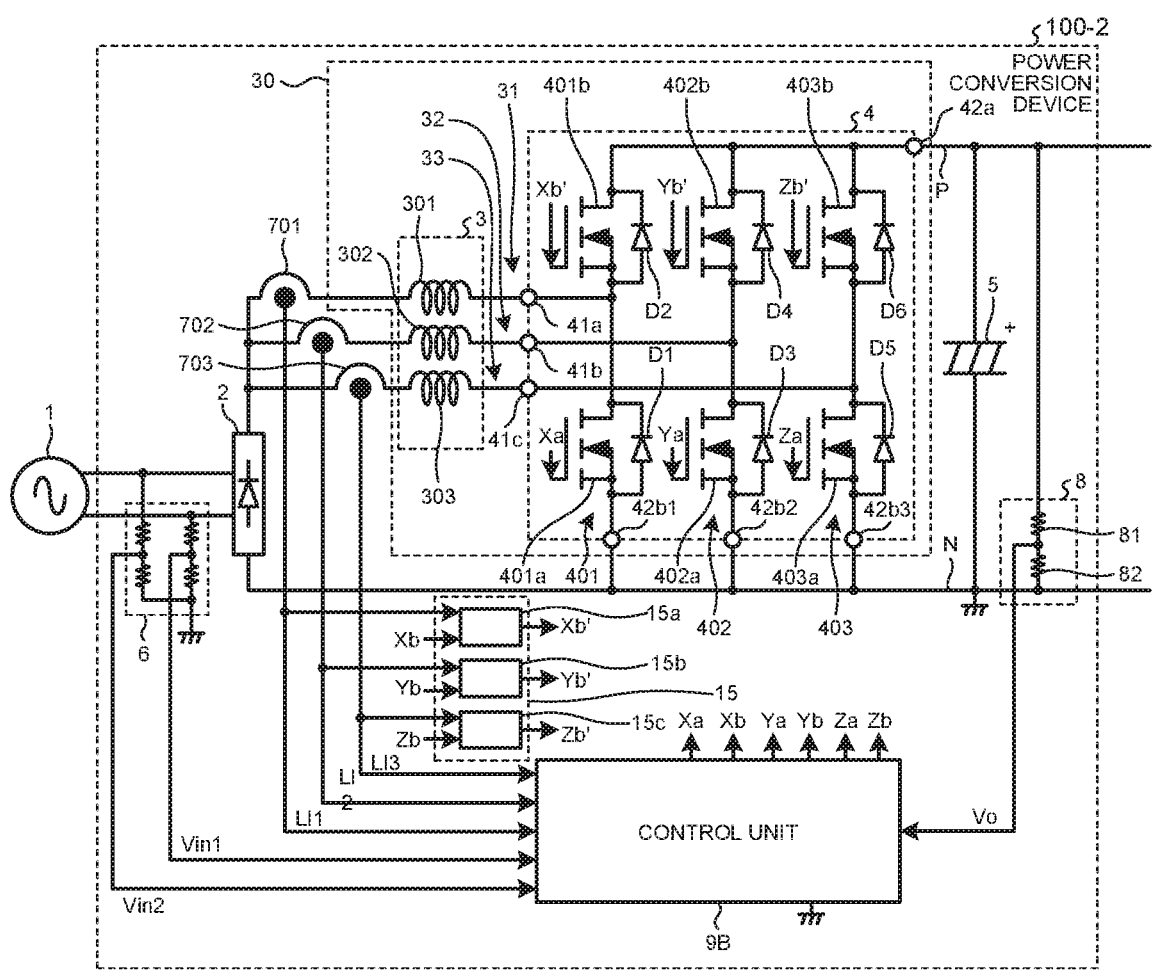
FIG. 12 is a configuration diagram of a power conversion device according to a second embodiment of the present invention.

FIG. 12 is a configuration diagram of a power conversion device according to a second embodiment of the present invention. Differences between the power conversion device 100-1 according to the first embodiment and a power conversion device 100-2 according to the second embodiment are as follows.

(1) The power conversion device 100-2 includes a first reactor current detecting unit 701, a second reactor current detecting unit 702, and a third reactor current detecting unit 703 instead of the bus current detecting unit 7.

(2) The power conversion device 100-2 includes a control unit 9B instead of the control unit 9, and also includes a drive pulse correcting unit 15.

The first reactor current detecting unit 701 detects a current flowing through the rectifying unit 2 and the first reactor 301. The current detected by the first reactor current detecting unit 701 is output as a reactor current LI1 to the control unit 9B and the drive pulse correcting unit 15. The reactor current LI1 represents a voltage corresponding to a value of the current flowing through the rectifying unit 2 and the first reactor 301.

The second reactor current detecting unit 702 detects a current flowing through the rectifying unit 2 and the second reactor 302. The current detected by the second reactor current detecting unit 702 is output as a reactor current LI2 to the control unit 9B and the drive pulse correcting unit 15. The reactor current LI2 represents a voltage corresponding to a value of the current flowing through the rectifying unit 2 and the second reactor 302.

The third reactor current detecting unit 703 detects a current flowing through the rectifying unit 2 and the third reactor 303. The current detected by the third reactor current detecting unit 703 is output as a reactor current LI3 to the control unit 9B and the drive pulse correcting unit 15. The reactor current LI3 represents a voltage corresponding to a value of the current flowing through the rectifying unit 2 and the third reactor 303.

The drive pulse correcting unit 15 includes a first drive pulse correcting unit 15a, a second drive pulse correcting unit 15b, and a third drive pulse correcting unit 15c. The first drive pulse correcting unit 15a corrects the second drive pulse Xb generated by the control unit 9B, based on the reactor current LI1, and outputs a second drive pulse Xb' after correction. The second drive pulse Xb' after correction is input to the second MOSFET 401b. The second drive pulse correcting unit 15b corrects the second drive pulse Yb generated by the control unit 9B, based on the reactor current LI2, and outputs a second drive pulse Yb' after correction. The second drive pulse Yb' after correction is input to the fourth MOSFET 402b. The third drive pulse correcting unit 15c corrects the second drive pulse Zb generated by the control unit 9B, based on the reactor current LI3, and outputs a second drive pulse Zb' after correction. The second drive pulse Zb' after correction is input to the sixth MOSFET 403b. Hereinafter, the reactor current LI1, the reactor current LI2, and the reactor current LI3 may be simply referred to as a reactor current.

Figure 13:
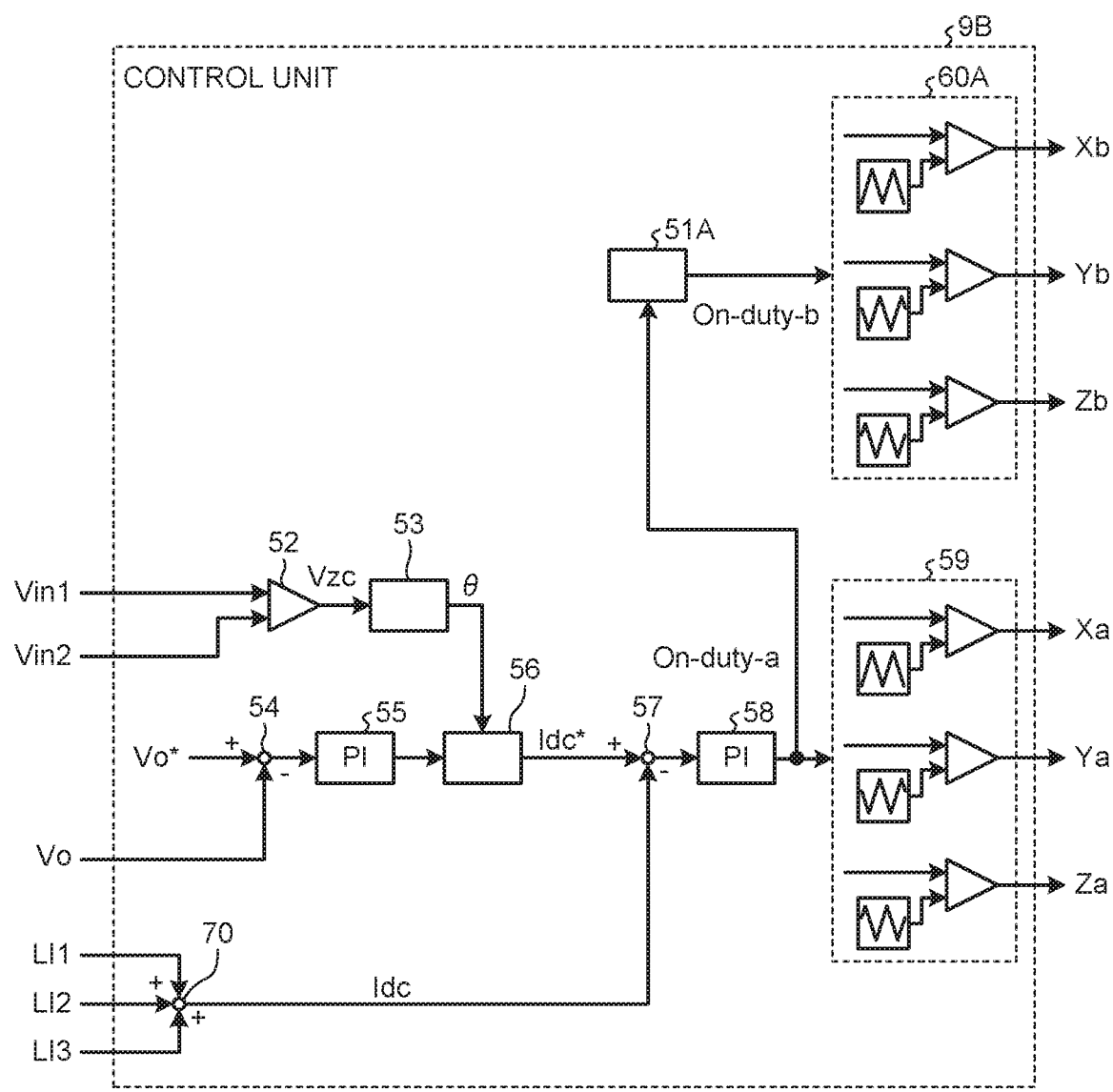
FIG. 13 is a configuration diagram of a control unit illustrated in FIG. 12.

FIG. 13 is a configuration diagram of the control unit illustrated in FIG. 12. Differences between the control unit 9 illustrated in FIG. 2 and the control unit 9B illustrated in FIG. 13 are as follows.

(1) The control unit 9B does not include the subtraction unit 50 nor the on-duty calculating unit 51, and includes an on-duty calculating unit 51A and a second drive pulse generating unit 60A instead of the on-duty calculating unit 51 and the second drive pulse generating unit 60.

In the control unit 9B, the reactor current LI1, the reactor current LI2, and the reactor current LI3 are used instead of the bus current Idc. The reactor current LI1, the reactor current LI2, and the reactor current LI3 are added together by an adder 70 included in the control unit 9B to obtain the bus current Idc. The on-duty calculating unit 51A calculates the On-duty-b being on-duty of the second drive pulse, based on the On-duty-a being on-duty of the first drive pulse. The second drive pulse generating unit 60A compares the On-duty-b being on-duty of the second drive pulse with each of three triangular waves that are shifted by 120 degrees from each other, thereby generating the second drive pulses Xb, Yb, and Zb. The second drive pulses Xb, Yb, and Zb each are a signal complementary to the first drive pulse to which the dead time is added. That is, when the first drive pulse is turned on, the second drive pulse is turned off, and when the first drive pulse is turned off, the second drive pulse is turned on.

Next, operation will be described of the drive pulse correcting unit 15 illustrated in FIG. 12. The drive pulse correcting unit 15 receives the reactor current and the second drive pulses Xb, Yb, and Zb as inputs, and outputs the second drive pulses Xb', Yb', and Zb' corrected. When the reactor current is greater than 0 [A], the drive pulse correcting unit 15 outputs the second drive pulses Xb, Yb, and Zb without correction as the second drive pulses Xb', Yb', and Zb'. That is, when the reactor current is greater than 0 [A], when voltage levels of the second drive pulses Xb, Yb, and Zb are High, the second drive pulses Xb', Yb', and Zb' of the High level are output, and when the voltage levels of the second drive pulses Xb, Yb, and Zb are Low, the second drive pulses Xb', Yb', and Zb' of the Low level are output. On the other hand, when the reactor current is equal to or less than 0 [A], the drive pulse correcting unit 15 outputs the second drive pulses Xb', Yb', and Zb' of the low level regardless of the voltage levels of the second drive pulses Xb, Yb, and Zb.

In the second embodiment, synchronous rectification can be performed only when the reactor current is greater than 0 [A]. However, when there is a possibility that the second drive pulses Xb, Yb, and Zb become High although the reactor current is equal to or less than 0 [A] due to delay of the operation of the drive pulse correcting unit 15 or delay of the operation of the MOSFET, for example, the drive pulse correcting unit 15, when the reactor current is greater than a set value M [A] that is a positive value set in advance, may output the second drive pulses Xb, Yb, and Zb without correction as the second drive pulses Xb', Yb', and Zb'; and when the reactor current is equal to or less than the set value M [A] that is the positive value set in advance, may output the second drive pulses Xb', Yb', and Zb' of the Low level regardless of the voltage levels of the second drive pulses Xb, Yb, and Zb.

Note that, the drive pulse correcting unit 15 may be constituted by combining general purpose integrated circuits (ICs), may be constituted by an application specific integrated circuit (ASIC) or a field programmable gate array (FPGA), or may be constituted by software that implements a control function in the control unit 9. A configuration by the combination of general purpose ICs, or a configuration by the ASIC or the FPGA is more responsive than a configuration by the software of the control unit 9, and a range is widened in which the first MOSFET 401a can be caused to perform synchronous rectification, and the loss can be reduced.

Figure 14:
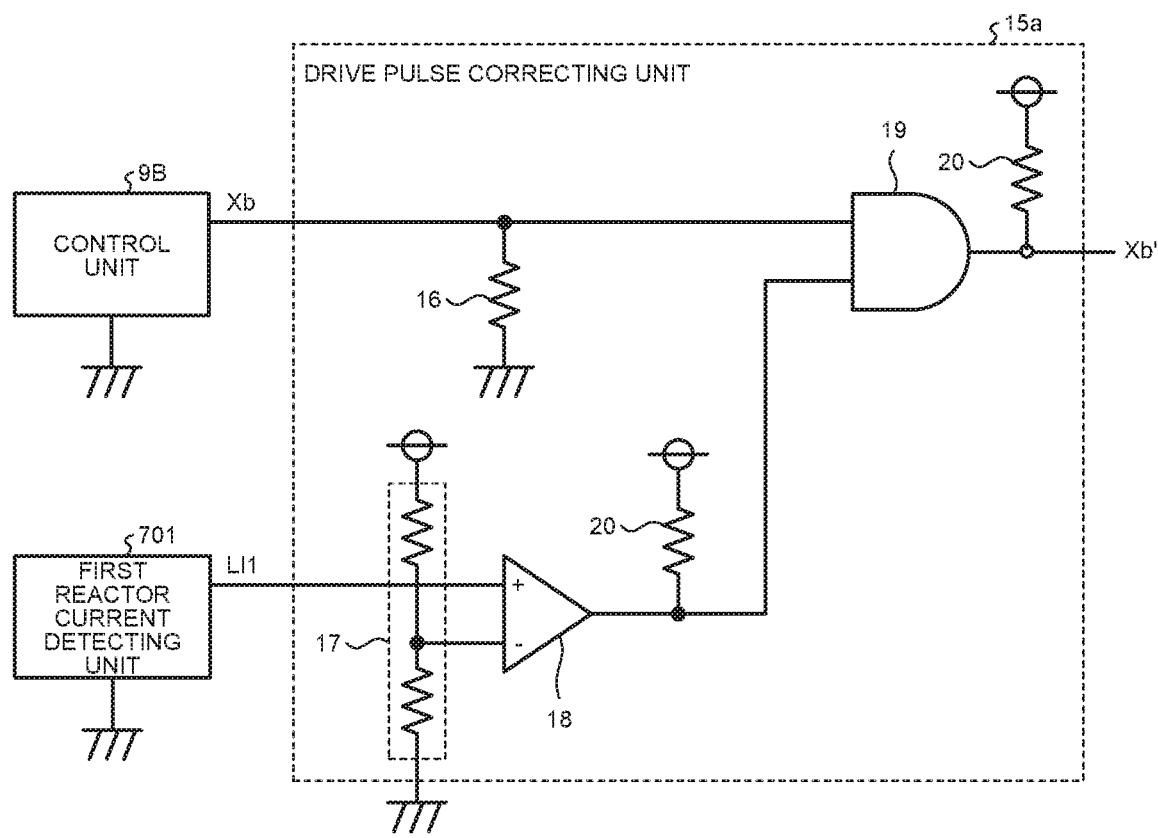
FIG. 14 is a diagram illustrating a hardware configuration example of a first drive pulse correcting unit included in a drive pulse correcting unit illustrated in FIG. 12.

FIG. 14 is a diagram illustrating a hardware configuration example of the first drive pulse correcting unit included in the drive pulse correcting unit illustrated in FIG. 12. FIG. 14 illustrates a configuration example of the first drive pulse correcting unit. Note that, it is assumed that the second drive pulse correcting unit 15b and the third drive pulse correcting unit 15c illustrated in FIG. 12 are constituted similarly to the first drive pulse correcting unit 15a illustrated in FIG. 14.

The first drive pulse correcting unit 15a includes a pull-down resistor 16, a reference voltage generating unit 17, a comparator 18, an AND circuit 19, and a pull-up resistor 20. The reference voltage generating unit 17 is constituted to generate a reactor current value equal to or greater than 0 [A] set in advance, for example, a voltage corresponding to 1 [A]. The comparator 18 compares the reactor current LI1 detected by the first reactor current detecting unit 701 with an output voltage of the reference voltage generating unit 17.

A level of an output voltage of the comparator 18 is High when a voltage corresponding to the reactor current LI1 is equal to or greater than the output voltage of the reference voltage generating unit 17, and is Low when the voltage corresponding to the reactor current LI1 is less than the output voltage of the reference voltage generating unit 17. The level of the output voltage of the comparator 18 is maintained by the pull-up resistor 20, and the second drive pulse Xb output from the control unit 9 is input to one input terminal of the AND circuit 19. The output voltage of the comparator 18 is input to the other input terminal of the AND circuit 19.

When the voltage level of the second drive pulse Xb is High and the level of the output voltage of the comparator 18 is High, the AND circuit 19 outputs the second drive pulse Xb' having the same level as the second drive pulse Xb. When the voltage level of the second drive pulse Xb is High and the level of the output voltage of the comparator 18 is Low, the AND circuit 19 outputs the second drive pulse Xb' of the Low level. That is, in the first drive pulse correcting unit 15a, when the reactor current LI1 is equal to or greater than 0 [A] set in advance, the second drive pulse Xb' is obtained having the same level as the second drive pulse Xb, and when the current LI1 is less than 0 [A] set in advance, the second drive pulse Xb' is obtained of the low level.

Figure 15:
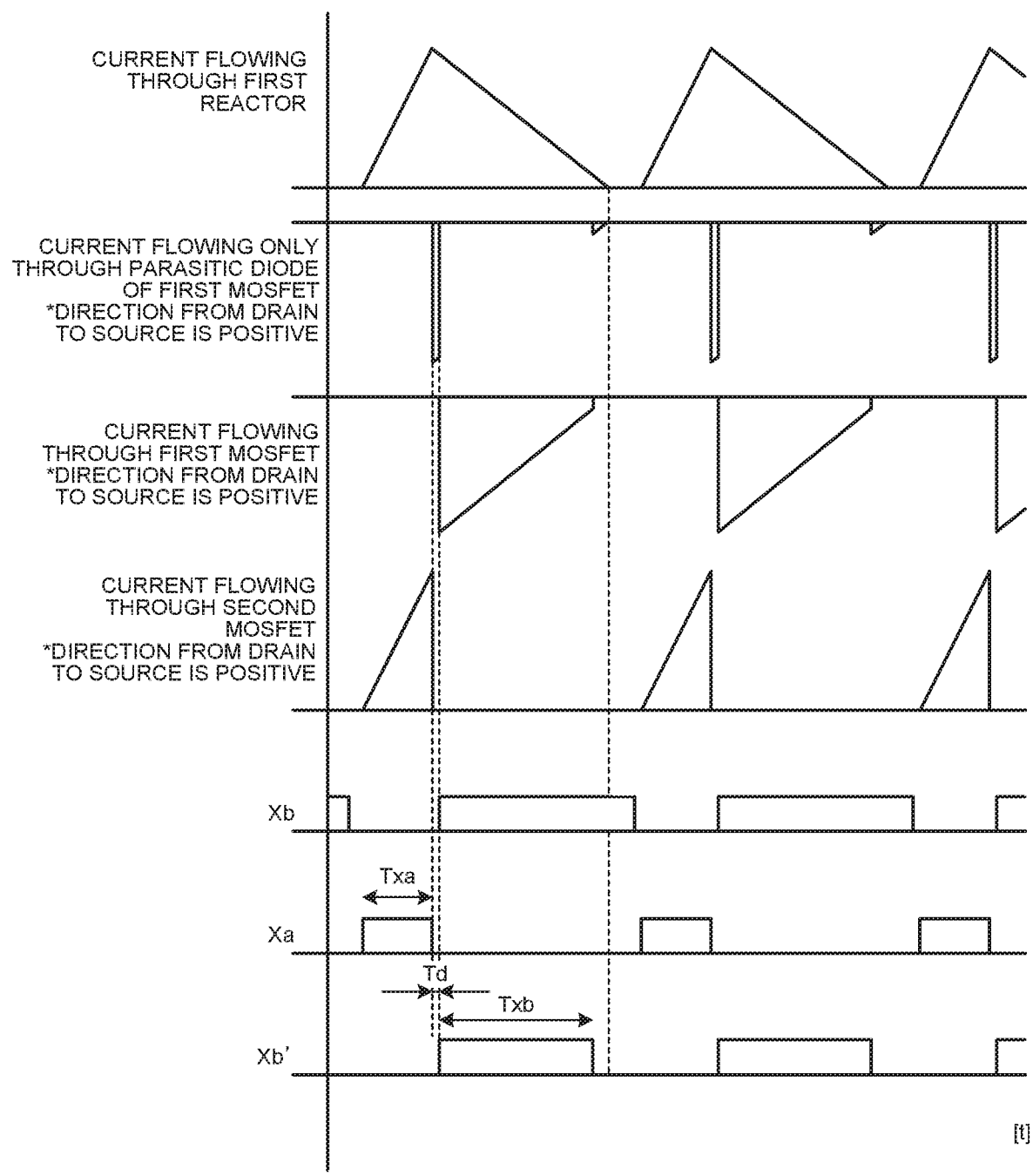
FIG. 15 is a timing chart illustrating a relationship among the current flowing through the first reactor, the current flowing through the parasitic diode of the first MOSFET, the current flowing through the first MOSFET, the current flowing through the second MOSFET, the second drive pulse, the first drive pulse, and a second drive pulse output from a first drive pulse correcting unit when the power conversion device according to the second embodiment of the present invention operates in the discontinuous mode.

FIG. 15 is a timing chart illustrating a relationship among the current flowing through the first reactor, the current flowing through the parasitic diode of the first MOSFET, the current flowing through the first MOSFET, the current flowing through the second MOSFET, the second drive pulse, the first drive pulse, and the second drive pulse output from the first drive pulse correcting unit when the power conversion device according to the second embodiment of the present invention operates in the discontinuous mode.

Differences between the timing chart illustrated in FIG. 8 and the timing chart illustrated in FIG. 15 are as follows.

(1) In FIG. 15, in addition to waveforms of the four currents, the drive pulse Xb of the second MOSFET 401b, and the drive pulse Xa of the first MOSFET 401a illustrated in FIG. 8, the second drive pulse Xb' is added corrected by the first drive pulse correcting unit 15a.

(2) FIG. 15 illustrates the ON time Txb of the second drive pulse Xb' instead of the ON time Txb of the second drive pulse Xb illustrated in FIG. 8.

(3) The ON time of the second drive pulse Xb illustrated in FIG. 15 is longer than the ON time Txb of the second drive pulse Xb illustrated in FIG. 8 with the delay of the operation of the drive pulse correcting unit 15 or the delay of the operation of the MOSFET.

The power conversion device 100-2 according to the second embodiment has an effect similar to that of the power conversion devices 100-1 and 100-1A according to the first embodiment, and the second drive pulses Xb', Yb', and Zb' of the Low level are input to the MOSFET even when the delay occurs of the operation of the drive pulse correcting unit 15 or of the operation of the MOSFET. For that reason, the reverse current is suppressed flowing to the reactor with the delay of the operation of the drive pulse correcting unit 15 or the delay of the operation of the MOSFET. Therefore, in the power conversion device 100-2 according to the second embodiment, similarly to the first embodiment, the control can be performed even when the synchronous rectification control and the interleaving control are combined, the loss can be reduced, and higher efficiency can be achieved.

Note that, since the number of current detecting units can be reduced in the power conversion devices 100-1 and 100-1A according to the first embodiment as compared with the power conversion device 100-2 according to the second embodiment, there is an effect that manufacturing costs can be reduced of the power conversion devices 100-1 and 100-1A.

Third Embodiment

Figure 16:
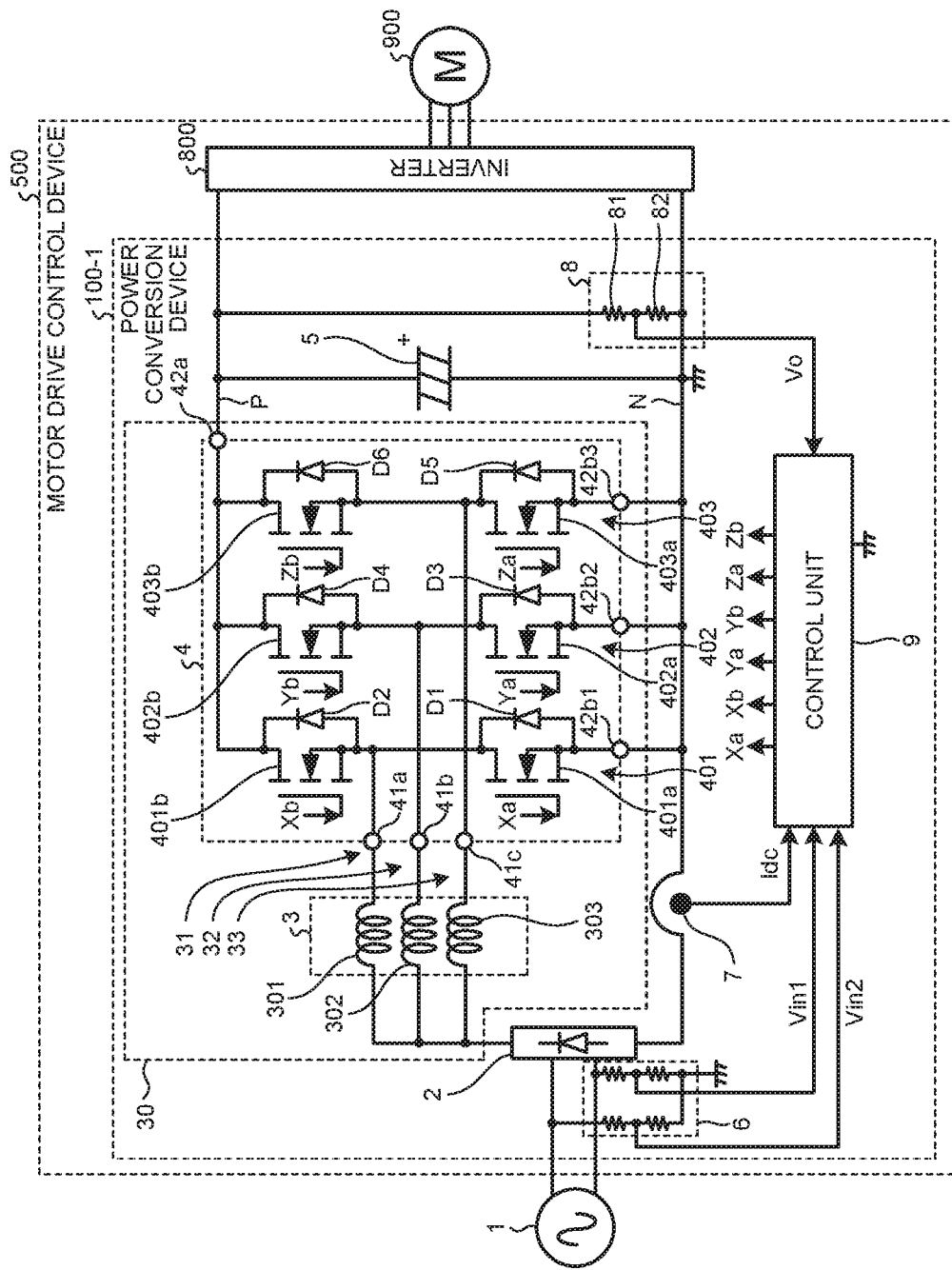
FIG. 16 is a configuration diagram of a motor drive control device according to a third embodiment.

FIG. 16 is a configuration diagram of a motor drive control device according to a third embodiment. A motor drive control device 500 according to the third embodiment includes the power conversion device 100-1 illustrated in FIG. 1, and an inverter 800 that converts a DC voltage that is an output of the power conversion device 100-1 to an AC voltage. The AC voltage output from the inverter 800 is applied to a motor 900 that is AC driven. Instead of the power conversion device 100-1 illustrated in FIG. 1, the power conversion device 100-1A illustrated in FIG. 10 or the power conversion device 100-2 illustrated in FIG. 12 may be used for the motor drive control device 500 according to the third embodiment. According to the motor drive control device 500 of the third embodiment, an effect can be obtained similar to that of the first or second embodiment also in the motor drive control device 500.

Fourth Embodiment

Figure 17:
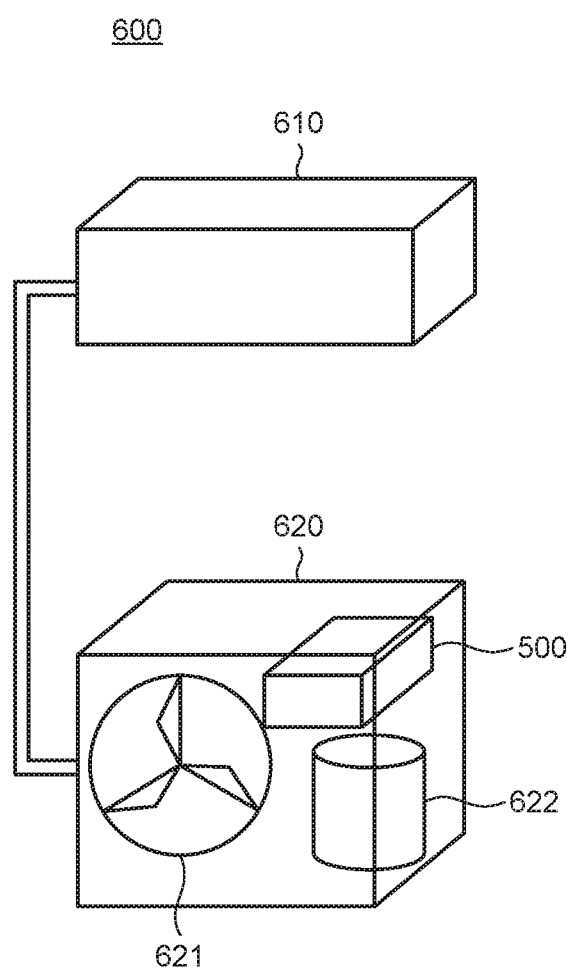
FIG. 17 is a configuration diagram of an air conditioner according to a fourth embodiment.

FIG. 17 is a configuration diagram of an air conditioner according to a fourth embodiment. An air conditioner 600 illustrated in FIG. 17 includes an indoor unit 610, and an outdoor unit 620 connected to the indoor unit 610. The outdoor unit 620 includes the motor drive control device 500 according to the third embodiment, a blower 621 including a motor driven by the motor drive control device 500, and a compressor 622 including a motor driven by the motor drive control device 500. The motor drive control device 500 performs drive control of at least one of the motor included in the blower 621 or the motor included in the compressor 622. According to the fourth embodiment, an effect can be obtained similar to that of the first embodiment or the second embodiment also in the air conditioner 600.

Note that, the motor drive control device 500 may be used as: a device that drives a refrigerant compressor mounted on a water heater or a hot water generator; a device that drives a blower (not illustrated) provided in the indoor unit 610; a device that drives a fan motor of a blower mounted on a blower typified by an electric fan; or a device that drives a motor that rotates a rotary compressor mounted on a vacuum pump or an air compressor.

In the first and second embodiments, the MOSFETs are used for a plurality of switching elements constituting the inverter power module 4; however, not limited to the MOSFET formed of a silicon-based material, for at least one of the plurality of switching elements constituting the inverter power module 4, a MOSFET formed of a wide band gap semiconductor may be used, such as silicon carbide, gallium nitride based material, or diamond to which a parasitic diode is inversely connected in parallel. When the MOSFET formed by the wide band gap semiconductor is used, the efficiency is further improved due to much lower loss, and the allowable current density is also increased since the dielectric withstanding voltage is high, so that the power conversion device can be downsized.

The configurations described in the above embodiments describe examples of contents of the present invention, and can be combined with other known techniques, and also a part of each configuration can be omitted or modified without departing from the gist of the present invention.

REFERENCE SIGNS LIST

1 AC power supply; 2 rectifying unit; 3 reactor; 4 inverter power module; 5 smoothing capacitor; power supply voltage detecting unit; 7 bus current detecting unit; 8 bus voltage detecting unit; 9, 9A, 9B control unit; 15 drive pulse correcting unit; 15a first drive pulse correcting unit; 15b second drive pulse correcting unit; 15c third drive pulse correcting unit; 16 pull-down resistor; 17 reference voltage generating unit; comparator; 19 AND circuit; 20 pull-up resistor; 30 booster circuit; 31 first chopper circuit; 32 second chopper circuit; 33 third chopper circuit; 41a first input terminal; 41b second input terminal; 41c third input terminal; 42a positive side output terminal; 42b1, 42b2, 42b3 negative side output terminal; 50, 54, 57 subtraction unit; 51, 51A on-duty calculating unit; 52 comparison unit; 53 power supply phase calculating unit; 55, 58, 58A, 56 current command value calculating unit; 59, 59A first drive pulse generating unit; 60, 60A second drive pulse generating unit; 70 adder; 81, 82 voltage dividing resistor; 100-1, 100-1A, 100-2 power conversion device; 301 first reactor; 302 second reactor; 303 third reactor; 401 first series circuit; 401a first MOSFET; 401b second MOSFET; 402 second series circuit; 402a third MOSFET; 402b fourth MOSFET; 403 third series circuit; 403a fifth MOSFET; 403b sixth MOSFET; 500 motor drive control device; 600 air conditioner; 610 indoor unit; 620 outdoor unit; 621 blower; 622 compressor; 701 first reactor current detecting unit; 702 second reactor current detecting unit; 703 third reactor current detecting unit; 800 inverter; 900 motor.

The invention claimed is:

1. A power conversion device of an interleaving type, comprising:
a rectifier rectifying an AC voltage output from an AC power supply;
a booster circuit boosting an output voltage of the rectifier;
a controller causing the booster circuit to perform synchronous rectification;
a smoothing capacitor smoothing an output voltage of the booster circuit;
a bus voltage detector detecting a bus voltage smoothed by the smoothing capacitor; and
a power supply voltage detector detecting a voltage of the AC power supply, wherein
the booster circuit is constituted by connecting a plurality of chopper circuits in parallel to each other, the chopper circuits each including an upper arm switching element and a lower arm switching element connected in series to a reactor connected to the rectifier, and
the controller, in a discontinuous mode, generates a drive pulse causing the upper arm switching element to be turned on when a reverse current flows through the upper arm switching element,
wherein the controller is configured to:
calculate a first drive pulse driving the lower arm switching element to cause a current output from the AC power supply to be controlled to have a sine wave form and to cause the bus voltage to have a specific value, based on the bus voltage detected by the bus voltage detector and the power supply voltage detected by the power supply voltage detector; and
calculate a second drive pulse driving the upper arm switching element, based on the bus voltage detected by the bus voltage detector, the power supply voltage detected by the power supply voltage detector, and the first drive pulse, wherein the second drive pulse satisfies a relationship of $Txb \leq Txa \times \{(Vin-2\times Vf-R\times i-Ron\times i)/(Vout-Vin-2\times Vf-R\times i-Ron\times i)\}$, where Txa represents an ON time of the first drive pulse,
Txb represents an ON time of the second drive pulse,
Vin represents an absolute value of an instantaneous voltage of the AC power supply,
Vf represents a forward drop voltage of a diode constituting the rectifier,
R represents a resistance of the reactor,
Ron represents an on-resistance of each of the upper arm switching element and the lower arm switching element,
Vout represents the bus voltage detected by the bus voltage detector, and
i represents a current flowing through the reactor.

2. The power conversion device according to claim 1, wherein
the controller calculates the ON time of the second drive pulse, Txb, by $Txb=Tsw-Txa-Td\times 2$ when a value obtained by $Txa+Txb+Td\times 2$ becomes equal to or greater than Tsw, where
Tsw represents a switching period at which the upper arm switching element and the lower arm switching element are driven, and
Td represents a dead time provided not to cause the upper arm switching element and the lower arm switching element to be short-circuited.

3. The power conversion device according to claim 1, further comprising:
a current detector detecting a current flowing through the reactor constituting each of the plurality of chopper circuits; and
a drive pulse corrector, when the current flowing through the reactor is greater than a set value, outputting to the upper arm switching element a second drive pulse that is output from the controller and drives the upper arm switching element, and when the current flowing through the reactor is equal to or less than the set value, setting a voltage level to Low of the second drive pulse that is output from the controller and drives the upper arm switching element and outputting the second drive pulse to the upper arm switching element.

4. The power conversion device according to claim 1, wherein
at least one of the upper arm switching element or the lower arm switching element is a metal oxide semiconductor field effect transistor formed of a wide band gap semiconductor.

5. The power conversion device according to claim 4, wherein
the wide band gap semiconductor is silicon carbide, a gallium nitride based material, or diamond.

6. A motor drive control device comprising:
the power conversion device according to claim 1; and
an inverter converting a DC voltage to an AC voltage, the DC voltage being an output of the power conversion device.

7. A blower comprising the motor drive control device according to claim 6.

8. An air conditioner comprising the blower according to claim 7.

9. A compressor comprising the motor drive control device according to claim 6.

10. An air conditioner comprising the compressor according to claim 9.

11. A power conversion device of an interleaving type, comprising:
a rectifier rectifying an AC voltage output from an AC power supply;
a booster circuit boosting an output voltage of the rectifier;
a controller causing the booster circuit to perform synchronous rectification;
a smoothing capacitor smoothing an output voltage of the booster circuit;
a bus voltage detector detecting a bus voltage smoothed by the smoothing capacitor; and
a power supply voltage detector detecting a voltage of the AC power supply, wherein
the booster circuit is constituted by connecting a plurality of chopper circuits in parallel to each other, the chopper circuits each including an upper arm switching element and a lower arm switching element connected in series to a reactor connected to the rectifier, and
the controller, in a discontinuous mode, generates a drive pulse causing the upper arm switching element to be turned on when a reverse current flows through the upper arm switching element,
wherein the controller is configured to:
calculate a first drive pulse driving the lower arm switching element to cause a current output from the AC power supply to be controlled to have a sine wave form and to cause the bus voltage to have a specific value, based on the bus voltage detected by the bus voltage detector and the power supply voltage detected by the power supply voltage detector; and
calculate a second drive pulse driving the upper arm switching element, based on the bus voltage detected by the bus voltage detector, the power supply voltage detected by the power supply voltage detector, and the first drive pulse, wherein
the second drive pulse satisfies a relationship of $Txb \leq Txa \times \{Vin/(Vout-Vin)\}$, where
Txa represents an ON time of the first drive pulse,
Txb represents an ON time of the second drive pulse,
Vin represents an absolute value of an instantaneous voltage of the AC power supply, and
Vout represents the bus voltage detected by the bus voltage detector.

12. The power conversion device according to claim 11, wherein
the controller calculates the ON time of the second drive pulse, Txb, by $Txb=Tsw-Txa-Td\times 2$ when a value obtained by $Txa+Txb+Td\times 2$ becomes equal to or greater than Tsw, where
Tsw represents a switching period at which the upper arm switching element and the lower arm switching element are driven, and
Td represents a dead time provided not to cause the upper arm switching element and the lower arm switching element to be short-circuited.

13. The power conversion device according to claim 11, further comprising:
a current detector detecting a current flowing through the reactor constituting each of the plurality of chopper circuits; and
a drive pulse corrector, when the current flowing through the reactor is greater than a set value, outputting to the upper arm switching element a second drive pulse that is output from the controller and drives the upper arm switching element, and when the current flowing through the reactor is equal to or less than the set value, setting a voltage level to Low of the second drive pulse that is output from the controller and drives the upper arm switching element and outputting the second drive pulse to the upper arm switching element.

14. The power conversion device according to claim 11, wherein
at least one of the upper arm switching element or the lower arm switching element is a metal oxide semiconductor field effect transistor formed of a wide band gap semiconductor.

15. The power conversion device according to claim 14, wherein
the wide band gap semiconductor is silicon carbide, a gallium nitride based material, or diamond.

16. A motor drive control device comprising:
the power conversion device according to claim 11; and
an inverter converting a DC voltage to an AC voltage, the DC voltage being an output of the power conversion device.

17. A blower comprising the motor drive control device according to claim 16.

18. An air conditioner comprising the blower according to claim 17.

19. A compressor comprising the motor drive control device according to claim 16.

20. An air conditioner comprising the compressor according to claim 19.

* * * * *